US011485256B2

(12) United States Patent
Nakano

(10) Patent No.: US 11,485,256 B2
(45) Date of Patent: Nov. 1, 2022

(54) SEAT SLIDING STRUCTURE FOR VEHICLE

(71) Applicant: TOYOTA JIDOSHA KABUSHIKI KAISHA, Aichi-ken (JP)

(72) Inventor: Shiro Nakano, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 60 days.

(21) Appl. No.: 16/746,963

(22) Filed: Jan. 20, 2020

(65) Prior Publication Data

US 2020/0254907 A1 Aug. 13, 2020

(30) Foreign Application Priority Data

Feb. 12, 2019 (JP) ............................ JP2019-022936

(51) Int. Cl.

| | |
|---|---|
| ***B60N 2/07*** | (2006.01) |
| ***B60N 2/08*** | (2006.01) |
| ***B60N 2/42*** | (2006.01) |
| ***B60N 2/427*** | (2006.01) |

(52) U.S. Cl.

CPC ......... *B60N 2/0727* (2013.01); *B60N 2/0818* (2013.01); *B60N 2/4221* (2013.01); *B60N 2/42709* (2013.01); *B60N 2/0862* (2013.01)

(58) Field of Classification Search

CPC .... B60N 2/4214; B60N 2/4221; B60N 2/427; B60N 2/42709; B60N 2/42718; B60N 2/42772; B60N 2/4279; B60N 2/0727; B60N 2/0818; B60N 2/0862

See application file for complete search history.

(56) References Cited

U.S. PATENT DOCUMENTS

| | | | | |
|---|---|---|---|---|
| 5,626,203 A * | 5/1997 | Habib | B60N 2/0276 | 180/274 |
| 5,685,603 A * | 11/1997 | Lane, Jr. | B60N 2/2821 | 297/216.11 |
| 6,227,597 B1 * | 5/2001 | Swann | B60N 2/4221 | 296/68.1 |
| 6,398,285 B2 * | 6/2002 | Motozawa | B60N 2/4221 | 296/68.1 |
| 6,851,505 B2 * | 2/2005 | Motozawa | B60N 2/4221 | 180/274 |

(Continued)

FOREIGN PATENT DOCUMENTS

| | | |
|---|---|---|
| DE | 102017117534 A1 | 2/2019 |
| JP | H2-81739 A | 3/1990 |

(Continued)

*Primary Examiner* — Jonathan Liu
*Assistant Examiner* — Guang H Guan
(74) *Attorney, Agent, or Firm* — Hauptman Ham, LLP

(57) ABSTRACT

A seat sliding structure for a vehicle includes: a pair of left and right slide rails that include upper rails, which are attached to a lower portion of a vehicle seat, and lower rails, which support the upper rails such that the upper rails can slide in a vehicle longitudinal direction; rail guiding members that are fixed to a floor panel, and that support the lower rails such that the lower rails can slide in the vehicle longitudinal direction between a driving position at a vehicle front side and a relaxation position at a vehicle rear side; and a locking mechanism that locks movement of the slide rails at the relaxation position, and that releases a locked state when a frontal collision of the vehicle is detected or predicted.

2 Claims, 21 Drawing Sheets

(56) References Cited

U.S. PATENT DOCUMENTS

| | | | | |
|---|---|---|---|---|
| 7,611,197 | B2 * | 11/2009 | Mattes | B60N 2/42736<br>297/216.14 |
| 8,434,819 | B2 * | 5/2013 | Guerrero | B60N 2/4221<br>297/216.16 |
| 8,678,510 | B2 * | 3/2014 | Masutani | B60R 22/1955<br>297/480 |
| 9,352,671 | B1 * | 5/2016 | Enders | B60N 2/42736 |
| 11,059,400 | B2 * | 7/2021 | Huf | B60N 2/0232 |
| 2011/0133529 | A1 | 6/2011 | Guerrero | |
| 2018/0281626 | A1 | 10/2018 | Murakami et al. | |
| 2018/0292821 | A1 | 10/2018 | Minato et al. | |
| 2020/0189427 | A1 * | 6/2020 | Huf | B60N 2/067 |
| 2020/0254907 | A1 * | 8/2020 | Nakano | B60N 2/42736 |
| 2020/0254908 | A1 * | 8/2020 | Nakano | B60N 2/0806 |
| 2020/0307425 | A1 * | 10/2020 | Hopfner | B60N 2/4214 |

FOREIGN PATENT DOCUMENTS

| | | | |
|---|---|---|---|
| JP | H3-164347 | A | 7/1991 |
| JP | H10-297425 | A | 11/1998 |
| JP | 2000-25499 | A | 1/2000 |
| JP | 2003-104150 | A | 4/2003 |
| JP | 2011-136685 | A | 7/2011 |
| JP | 2015-147527 | A | 8/2015 |
| JP | 2018-176792 | A | 11/2018 |
| JP | 2018-176902 | A | 11/2018 |
| WO | 2009/108140 | A1 | 9/2009 |
| WO | 2013/111167 | A1 | 8/2013 |

* cited by examiner 16
25
22
24
20
14
12
10
24
20
34
34A
34
34A
26
44
32B
32A
32
32A
32B
32
UP
RH
FR 20
22
24
24A
26
26A
28
28
30
30
32
32A
32B
36
38
40
42
44
44A
UP
RH 26
20
22
46
24
54
48
50
W
58
56
52
44
RH
FR 20
22
46
44
54
58
56
50
24
W
26
52
RH
FR 22
66
14
12
34
60
20
24
10
64
43
46
76
68B
70
74
32
44
26
68
UP
FR
72
68A
44
62

UP
FR
10
12
14
20
22
24
26
32
34
43
44
44
46
60
62
64
66
68
68A
68B
70
72
76

66
26
60
22
14
12
20
64
46
70
10
32
76
68B
32
68
UP
FR
68A
44
72
62

26
64
60
61A
44
61
61
65
63A
61B
73
63
75
67
63B
69
71
62
UP
FR 26
64
60
44
61A
61
61B
65
63B
63A
63
67
75
73
69
71
62
UP
FR 22
20
24
81
83
84
85
54
80
56
82
44
50
86
87
52
W
88
26
13
RH
FR 83
82B
26
24B
26B
82A
43
45
43A
41B
41A
80
43B
41
24
82
UP
FR 22
20
24
81
83
84
85
54
80
86
82
15
50
87
44
88
52
W
26
RH
FR 24
26
82B
26B
82A
83
82
41
24B
43
45
43A
41B
41A
80
43B
UP
FR 22
20
24
81
95
83
84
54
80
90
56
82
44
93(94)
50
52
W
26
RH
FR 90
94
93A
93
92
95
92A
95B
95A
81
94A
83

22
20
24
81
95
83
R1
R2
80
54
93(94)
90
82
50
52
W
26
RH
FR 22
20
24
81
83
84
80
82
90
93(94)
44
50
52
W
26
RH
FR 100
100A
100B
99
98
93A
94
95
95A
96
92
97
92A
95B
93
94A
98
100B
99
100
100A 100
100A
99
100B
98
96
95A(95)
98
100B
99
100
100A

SEAT SLIDING STRUCTURE FOR VEHICLE

CROSS-REFERENCE TO RELATED APPLICATION

This application claims priority under 35 USC 119 from Japanese Patent Application No. 2019-022936 filed on Feb. 12, 2019, the disclosure of which is incorporated by reference herein.

BACKGROUND

Technical Field

The present disclosure relates to a seat sliding structure for a vehicle.

Related Art

Japanese Patent Application Laid-Open (JP-A) No. 2018-176902 discloses a structure having a first sliding mechanism and a second sliding mechanism that make it possible to move, in the vehicle longitudinal direction, a vehicle seat in which a vehicle occupant is seated. Further, in this JP-A No. 2018-176902, control is carried out such that the vehicle seat can be slid toward the rear side more so during automatic driving than at times of manual driving.

However, in JP-A No. 2018-176902, at the time of a front collision of the vehicle that is in a state in which the vehicle seat has been slid rearward, there is the possibility that the driver will not be able to be restrained well by restraining devices such as the airbags for the driver's seat, the knee airbag, and the like.

SUMMARY

The present disclosure provides a seat sliding structure for a vehicle that may improve the collision safety performance at the time of a front collision of the vehicle.

A first aspect of the present disclosure includes: a pair of left and right slide rails that include upper rails, which are attached to a lower portion of a vehicle seat, and lower rails, which support the upper rails such that the upper rails can slide in a vehicle longitudinal direction; rail guiding members that are fixed to a floor panel, and that support the lower rails such that the lower rails can slide in the vehicle longitudinal direction between a driving position at a vehicle front side and a relaxation position at a vehicle rear side; and a locking mechanism that locks movement of the slide rails at the relaxation position, and that releases a locked state when a frontal collision of the vehicle is detected or predicted.

In the seat sliding structure for a vehicle relating to the first aspect of the present disclosure, the pair of left and right slide rails that include the upper rails and the lower rails. The upper rails are supported by the lower rails so as to be able to slide in the vehicle longitudinal direction. The lower rails are supported by the rail guiding members so as to be able to slide in the vehicle longitudinal direction between driving positions and the relaxation position. At the relaxation position, movement of the slide rails is locked by the locking mechanism. Here, the locking mechanisms release the locked states at the time when a front collision of the vehicle is detected or predicted. Due thereto, after a collision, the slide rails move inertially toward the driving positions, and the vehicle occupant can be restrained by the existing restraining devices, such as the airbags for the driver's seat, the knee airbag, and the like.

A second aspect of the present disclosure, in the first aspect, may further include a damping mechanism that, at a time of frontal collision of the vehicle, damps inertial movement of the slide rails from the relaxation position toward the vehicle front side.

The seat sliding structure for a vehicle relating to the second aspect of the present disclosure include the damping mechanism that, at the time of a front collision of the vehicle, damps inertial movement of the slide rails from the relaxation position toward the vehicle front side. Due thereto, the vehicle seat can be moved toward the vehicle front side while the posture of the vehicle occupant who is seated in the vehicle seat is maintained as is. Namely, the occurrence of the so-called submarine phenomenon, in which the vehicle occupant sinks-in toward the vehicle front side, may be suppressed.

In a third aspect of the present disclosure, in the second aspect, the damping mechanism may include rods that are provided below the slide rails and that extend in the vehicle longitudinal direction, of which at least rear portions are configured to move upward, pop-up devices that, when operated, move the rods upward, and rod receiving portions that move together with the slide rails, the pop-up devices are configured to be operated when the slide rails are at the relaxation position and a frontal collision of the vehicle is detected or predicted, and the rod receiving portions engage with the rear portions of the rods that have moved upward, and, in conjunction with inertial movement of the slide rails toward the vehicle front side, crush the rods in axial directions.

In the seat sliding structure for a vehicle relating to the third aspect of the present disclosure, the damping mechanism includes the rods, the pop-up devices, and the rod receiving portions. When a front collision of the vehicle is detected or predicted, the rear end portions of the rods are moved upward by the pop-up devices. Due thereto, the rear end portions of the rods and the rod receiving portions engage with one another. Further, due to the locked states of the slide rails by the locking mechanisms being released, after a collision, the slide rails are inertially moved from the relaxation position toward the vehicle front side. At this time, due to the rod receiving portions moving inertially toward the vehicle front side together with the slide rails, the rods are crushed in the axial direction, and inertial movement of the slide rails may be damped.

A fourth aspect of the present disclosure, in the second aspect, may further include a moving mechanism that includes a cross member that connects the pair of left and right slide rails in a vehicle transverse direction, a wire that is trained around pulleys that are provided as a pair in the vehicle longitudinal direction, and a fixing bracket that fixes the wire to the cross member, wherein the damping mechanism has a deforming member having one end side that is mounted to the cross member and another end side that is attached to the wire, the deforming member being plastically deformed by being pulled and stretched in conjunction with inertial movement of the cross member toward the vehicle front side.

In the seat sliding structure for a vehicle relating to the fourth aspect of the present disclosure, due to the wire that is trained between the pulleys being moved, the fixing bracket can be moved in the vehicle longitudinal direction. Due thereto, the pair of left and right slide rails can be moved in the vehicle longitudinal direction via the cross member between the driving positions and the relaxation position.

Further, the damping mechanism has the deforming member that connects the wire and the cross member. This deforming member is plastically deformed by being pulled and stretched accompanying the inertial movement of the cross member toward the vehicle front side. Due thereto, the deforming member is plastically deformed in a case in which the slide rails inertially move from the relaxation position toward the vehicle front side at the time of a front collision of the vehicle. As a result, inertial movement of the slide rails can be damped.

In a fifth aspect of the present disclosure, in the second aspect, the damping mechanism may include moving bodies, which move inertially toward the vehicle front side integrally with the lower rails at a time of frontal collision of the vehicle, and an energy absorbing member which, in conjunction with inertial movement of the moving bodies, damps the inertial movement of the slide rails toward the vehicle front side.

In the seat sliding structure for a vehicle relating to the fifth aspect of the present disclosure, when the slide rails are moved inertially from the relaxation position toward the vehicle front side at the time of a front collision of the vehicle, the moving bodies are moved inertially toward the vehicle front side integrally with the lower rails of the slide rails. At this time, the energy absorbing member damps the inertial movement of the slide rails toward the vehicle front side in conjunction with the inertial movement of the moving bodies.

In sixth aspect of the present disclosure, in the fifth aspect, the energy absorbing member may be a deforming member that is plastically deformed by being pulled and stretched in conjunction with the inertial movement of the moving bodies.

In the seat sliding structure for a vehicle relating to a sixth aspect of the present disclosure, the deforming member is connected to the moving bodies via wires. Due thereto, the deforming member is pulled and stretched in conjunction with inertial movement of the moving bodies toward the seat front side at the time of a front collision of the vehicle. As a result, the deforming member may be plastically deformed, and the inertial movement of the slide rails toward the vehicle front side may be damped.

In a seventh aspect of the present disclosure, in the fifth aspect, the energy absorbing member may include a first disc, which is connected via a wire to one of the moving bodies, and a second disc, which is connected via a wire to another of the moving bodies and is superposed with the first disc, and the first disc may be rotated in one direction in conjunction with movement of the one of the moving bodies toward the vehicle front side, and the second disc may be rotated in an opposite direction to the first disc in conjunction with movement of the other of the moving bodies toward the vehicle front side.

In the seat sliding structure for a vehicle relating to the seventh aspect of the present disclosure, the first disc is connected to one of the moving bodies via a wire, and the second disc is connected to another of the moving bodies via a wire. Further, the first disc and the second disc are superposed, and are rotated in directions opposite to one another in conjunction with movement of the respective moving bodies. Due thereto, frictional resistance arises at the planarly contacting portions of the first disc and the second disc, and inertial movement of the slide rails toward the vehicle front side may be damped.

As described above, in accordance with the seat sliding structure for a vehicle relating to the present disclosure, the collision safety performance may be improved at the time of a front collision of the vehicle.

BRIEF DESCRIPTION OF THE DRAWINGS

Exemplary embodiments will be described in detail based on the following figures, wherein.

DETAILED DESCRIPTION

First Embodiment

A seat sliding structure for a vehicle relating to a first embodiment is described hereinafter with reference to the drawings. Note that arrow FR that is shown appropriately in the respective drawings indicates the vehicle forward direction, arrow UP indicates the vehicle upward direction, and arrow RH indicates the vehicle right side. Hereinafter, when description is given by using longitudinal, left-right and vertical directions, they refer to the longitudinal of the vehicle longitudinal direction, the left and the right of the vehicle transverse direction, and the vertical of the vehicle vertical direction, unless otherwise specified.

Figure 1:
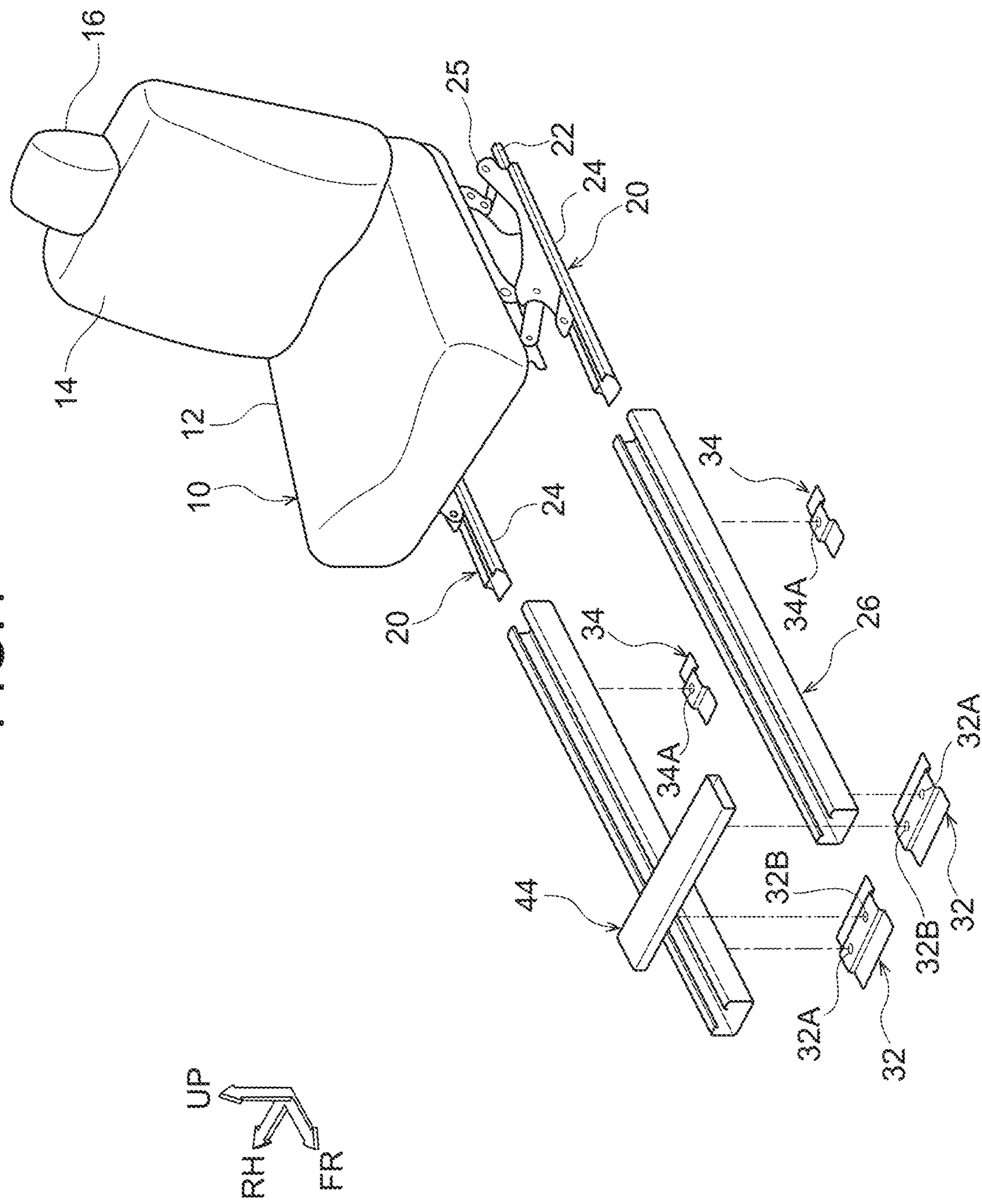
FIG. 1 is an exploded perspective view showing the overall structure of a seat sliding structure for a vehicle relating to a first embodiment.

As shown in FIG. 1, a vehicle seat 10, to which a seat sliding structure for a vehicle of the present embodiment is applied, is structured to include a seat cushion 12, a seatback 14 and a headrest 16.

The seat cushion 12 extends in the vehicle transverse direction and the vehicle longitudinal direction, and can support the femoral regions and the buttocks of the vehicle occupant from the vehicle lower side. The seatback 14 is rotatably connected to the rear end portion of the seat cushion 12. The seatback 14 extends toward the vehicle upper side from the rear end portion of the seat cushion 12, and can support the back portion of the vehicle occupant from the vehicle rear side.

The headrest 16 is provided at the upper end portion of the seatback 14. The headrest 16 is positioned at the vehicle rear side of the head portion of the vehicle occupant, and can support the head portion of the vehicle occupant from the vehicle rear side.

Here, a pair of left and right slide rails 20 are provided at the lower portion of the vehicle seat 10. Each of the slide rails 20 is mounted beneath the seat cushion 12, and is structured to include an upper rail 22 that is disposed at the upper side and a lower rail 24 that is disposed at the lower side.

Figure 2:
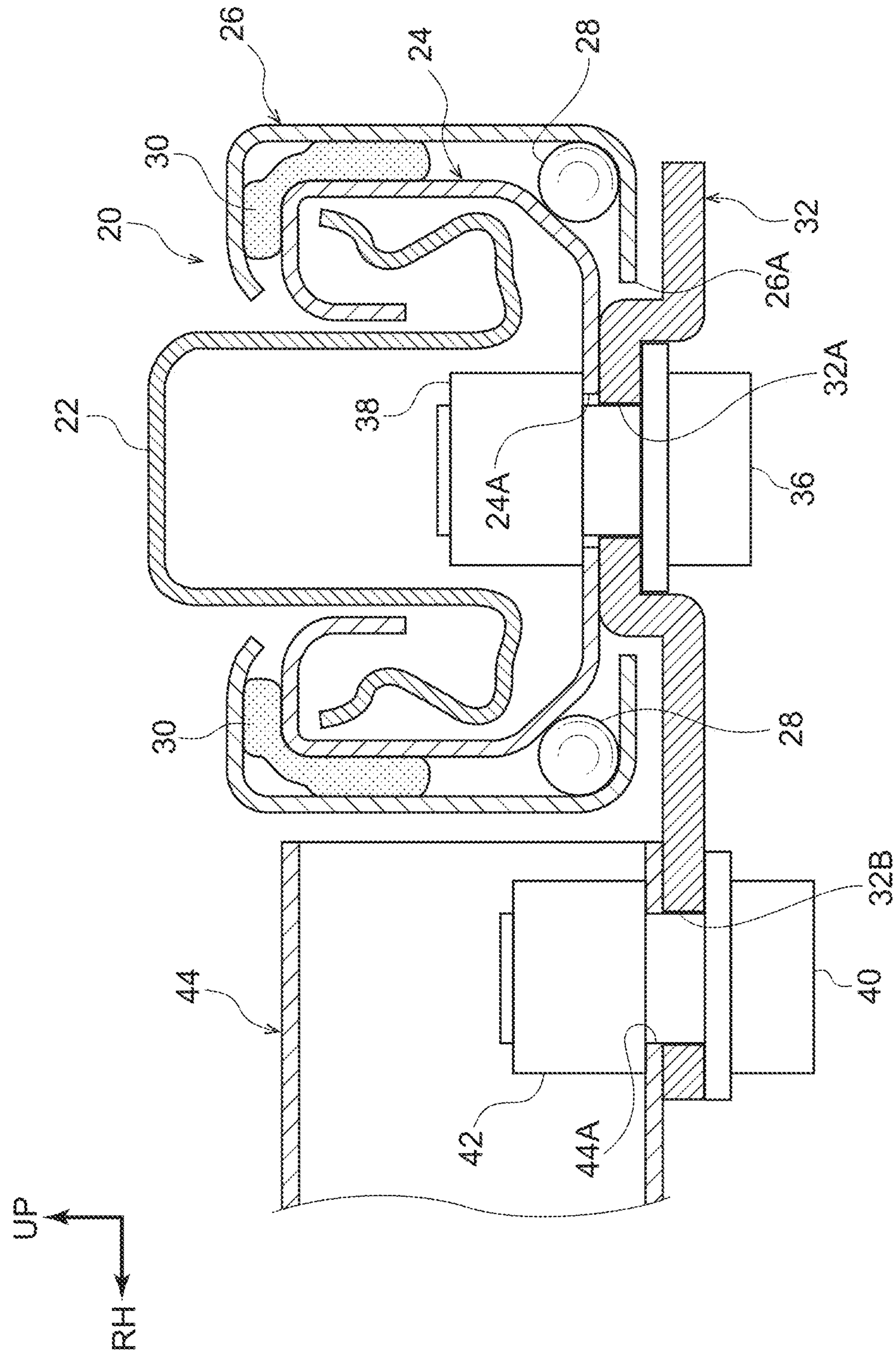
FIG. 2 is an enlarged sectional view that is seen from a vehicle front side and shows, in an enlarged manner, a slide rail at a vehicle left side and a cross member in the first embodiment.

The upper rails 22 are mounted to the seat cushion 12 via a lifter mechanism 25 that can adjust the height of the seat cushion. Further, as shown in FIG. 2, the upper rail 22 is formed, in cross-section, substantially in the shape of a hat whose vehicle lower side is open. The vehicle transverse direction both end portions of the upper rail 22 are folded-over toward the upper side.

The lower rail 24 is provided at the lower side of the upper rail 22 so as to cover the lower portion and the both side portions of the upper rail 22. Concretely, in a cross-sectional view seen from the vehicle longitudinal direction, the vehicle transverse direction both end portions of the lower rail 24 extend in the vehicle vertical direction along the side portions of the upper rail 22, and the upper end portions of the lower rail 24 are folded-over so as to envelop the vehicle transverse direction both end portions of the upper rail 22. Further, a mounting hole 24A is formed in the bottom surface of the lower rail 24.

Unillustrated ball bearings are provided between the upper rail 22 and the lower rail 24, and the upper rail 22 can slide in the vehicle longitudinal direction with respect to the lower rail 24. Namely, the lower rail 24 supports the upper rail 22 such that the upper rail 22 can slide in the vehicle longitudinal direction. The slide rail 20 is structured as described above.

A rail guiding member 26 is provided at the outer side of each of the slide rails 20. The rail guiding member 26 is formed in a substantial U-shape whose upper side is open, as seen in a cross-section viewed from the vehicle longitudinal direction. The upper end portions of the rail guiding member 26 are bent in the vehicle transverse direction so as to cover the upper end portions of the lower rail 24. Further, a slit hole 26A is formed in the bottom surface of the rail guiding member 26. The slit hole 26A extends in the vehicle longitudinal direction from the front end portion to the rear end portion of the rail guiding member 26.

Ball bearings 28 and shoes 30 are provided between the rail guiding member 26 and the lower rail 24 (the slide rail 20). Namely, the rail guiding member 26 supports the lower rail 24 such that the lower rail 24 can slide in the vehicle longitudinal direction.

As shown in FIG. 1, the rail guiding members 26 are formed to be longer than the slide rails 20 in the vehicle longitudinal direction. Further, the rail guiding members 26 are fixed to an unillustrated floor panel that structures the floor surface of the vehicle cabin.

Here, front side brackets 32 and rear side brackets 34 are provided beneath the rail guiding members 26. The front side brackets 32 are provided beneath the respective rail guiding members 26, and are formed in substantial hat shapes as seen from the vehicle transverse direction.

As shown in FIG. 2, a first bolt hole 32A and a second bolt hole 32B are formed in the peak portion of the front side bracket 32 that is provided at the vehicle left side. The first bolt hole 32A is formed in the left side end portion of the front side bracket 32. A bolt 36 is inserted-through the first bolt hole 32A from beneath. The bolt 36 is inserted-through the first bolt hole 32A of the front side bracket 32 and the mounting hole 24A of the lower rail 24, and is screwed into a nut 38. Due thereto, the lower rail 24 and the front side bracket 32 are fastened together. Note that the region where the first bolt hole 32A is formed at the front side bracket 32 is a projecting portion that projects-out upwardly, and illustration of the projecting portion is omitted in FIG. 1.

The second bolt hole 32B is formed in the right side end portion of the front side bracket 32. A bolt 40 is inserted-through the second bolt hole 32B from beneath. The bolt 40 is inserted-through the second bolt hole 32B of the front side bracket 32 and a mounting hole 44A of a cross member 44 that is described later, and is screwed into a nut 42. Due thereto, the cross member 44 and the front side bracket 32 are fastened together.

As shown in FIG. 1, the front side bracket 32 that is at the vehicle right side is disposed so as to have left-right symmetry with respect to the front side bracket 32 that is at the vehicle left side. Further, the cross member 44 is provided between the pair of left and right rail guiding members 26. The cross member 44 is formed substantially in the shape of an angular tube whose axial direction is the vehicle transverse direction, and the both end portions of the cross member 44 are fastened to the respective front side brackets 32. Because the lower rails 24 and the front side brackets 32 are connected, the pair of left and right slide rails 20 are connected in the vehicle transverse direction by the cross member 44. Further, the cross member 44 is structured so as to move in the vehicle longitudinal direction in conjunction with movement of the slide rails 20 in the vehicle longitudinal direction.

The rear side brackets 34 are provided further toward the vehicle rear side than the front side brackets 32. A bolt hole 34A is formed in the peak portion of the rear side bracket 34. An unillustrated bolt is inserted-through the bolt hole 34A from beneath. The rear side bracket 34 and the lower rail 24 are fastened together due to the bolt being inserted-through the lower rail 24 and screwed-into an unillustrated nut.

Figure 4:
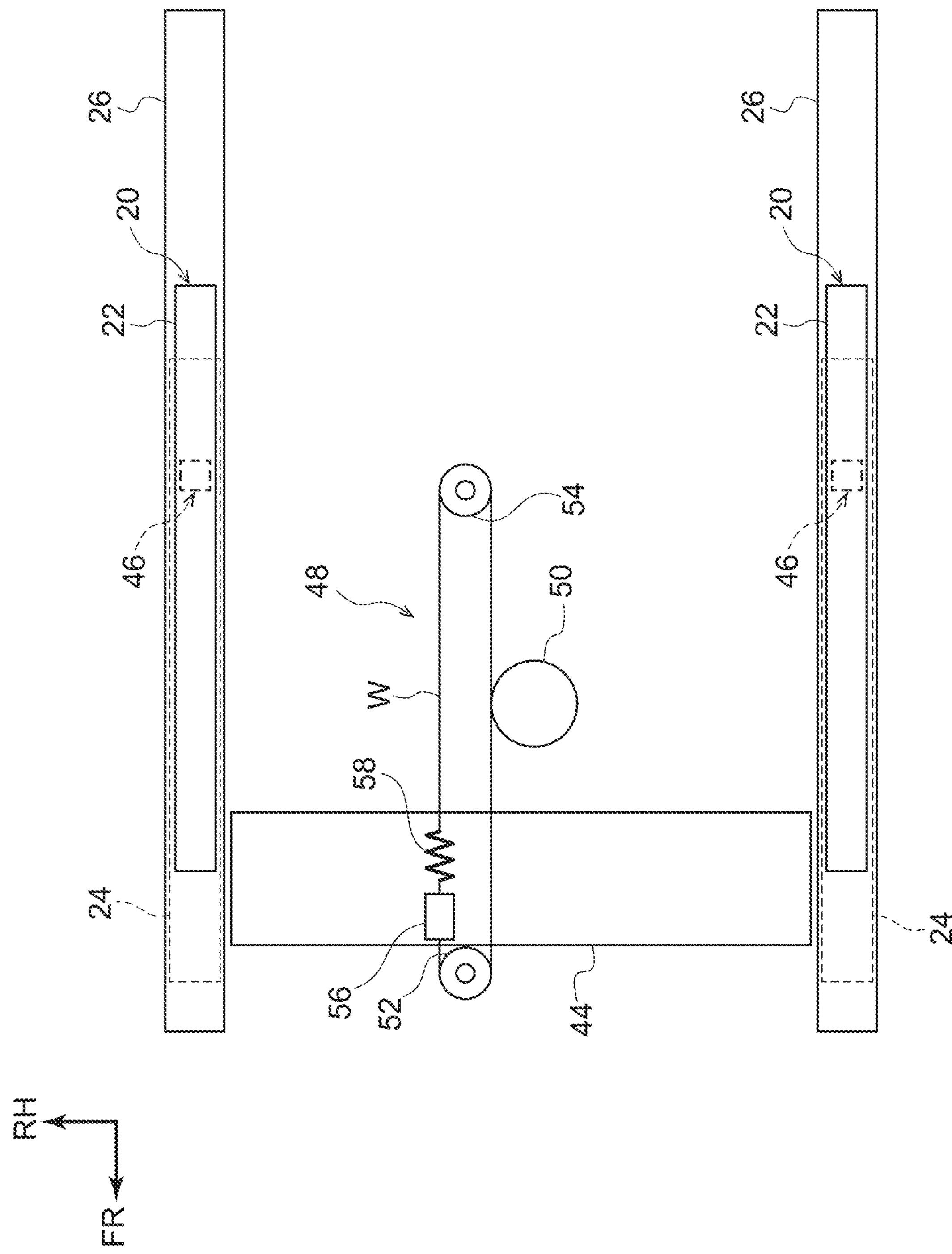
FIG. 4 is a schematic plan view that schematically shows the overall structure of the seat sliding structure for a vehicle relating to the first embodiment, and is a drawing showing a state in which the slide rails are at driving positions.

As shown in FIG. 4, a moving mechanism 48 is provided between the pair of left and right slide rails 20. As an example, the moving mechanism 48 of the present embodiment is structured to include the cross member 44, a front side pulley 52, a rear side pulley 54, a wire W, a fixed bracket 56, and a motor 50 that is a drive source.

The front side pulley 52 and the rear side pulley 54 are disposed with an interval therebetween in the vehicle longitudinal direction. The wire W is trained around the front side pulley 52 and the rear side pulley 54. The fixed bracket 56 is mounted to the wire W, and the fixed bracket 56 is fixed to the cross member 44. Due thereto, due to the wire W moving between the front side pulley 52 and the rear side pulley 54, the cross member 44 moves in the vehicle longitudinal direction via the fixed bracket 56.

The motor 50 is disposed in a vicinity of the wire W, and transmits motive power to the wire W. Note that the motive power of the motor 50 may be transmitted via a roller that contacts the wire W.

A state in which the cross member 44 is positioned at a driving position is shown in FIG. 4. Namely, the slide rails 20 are, together with the cross member 44, positioned at the vehicle front side, and this is the position at the time when the vehicle occupant, who is seated in the vehicle seat 10 that is provided on the slide rails 20, is driving.

Figure 5:
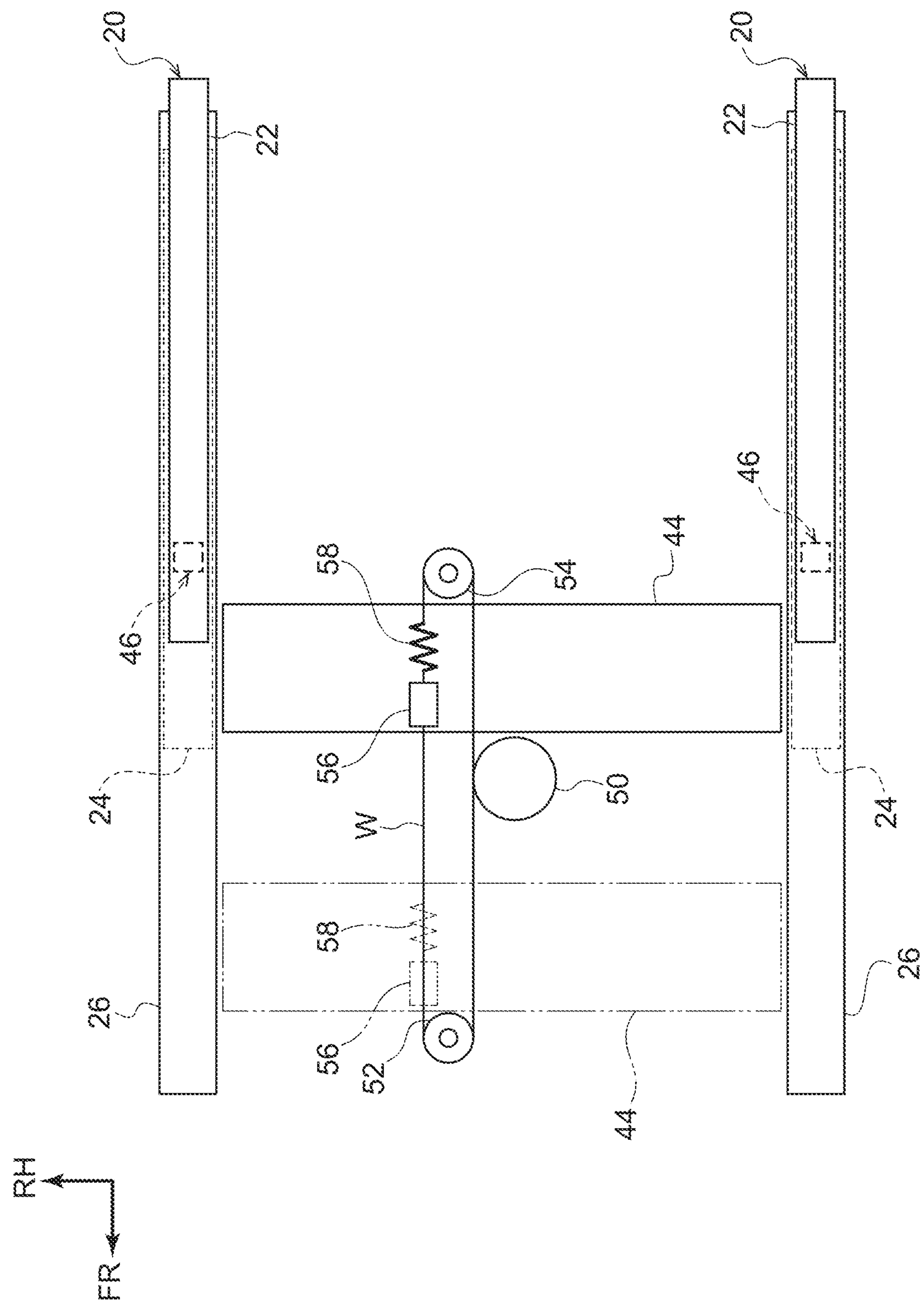
FIG. 5 is a schematic plan view showing a state in which the slide rails have been moved from the state of FIG. 4 to relaxation position.

On the other hand, as shown in FIG. 5, due to the motor 50 being driven and the wire W being moved, the cross member 44 is moved toward the vehicle rear side. A state in which the cross member 44 is positioned at a relaxed position is shown in FIG. 5. At this position, the vehicle seat 10 that is provided on the slide rails 20 is apart from an unillustrated steering wheel, and a space is ensured at the front of the vehicle occupant. Therefore, in a vehicle that is equipped with an automatic driving function or the like, the vehicle occupant can assume a relaxed posture by moving the vehicle seat 10 to the relaxed position at the time of automatic driving.

Figure 3:
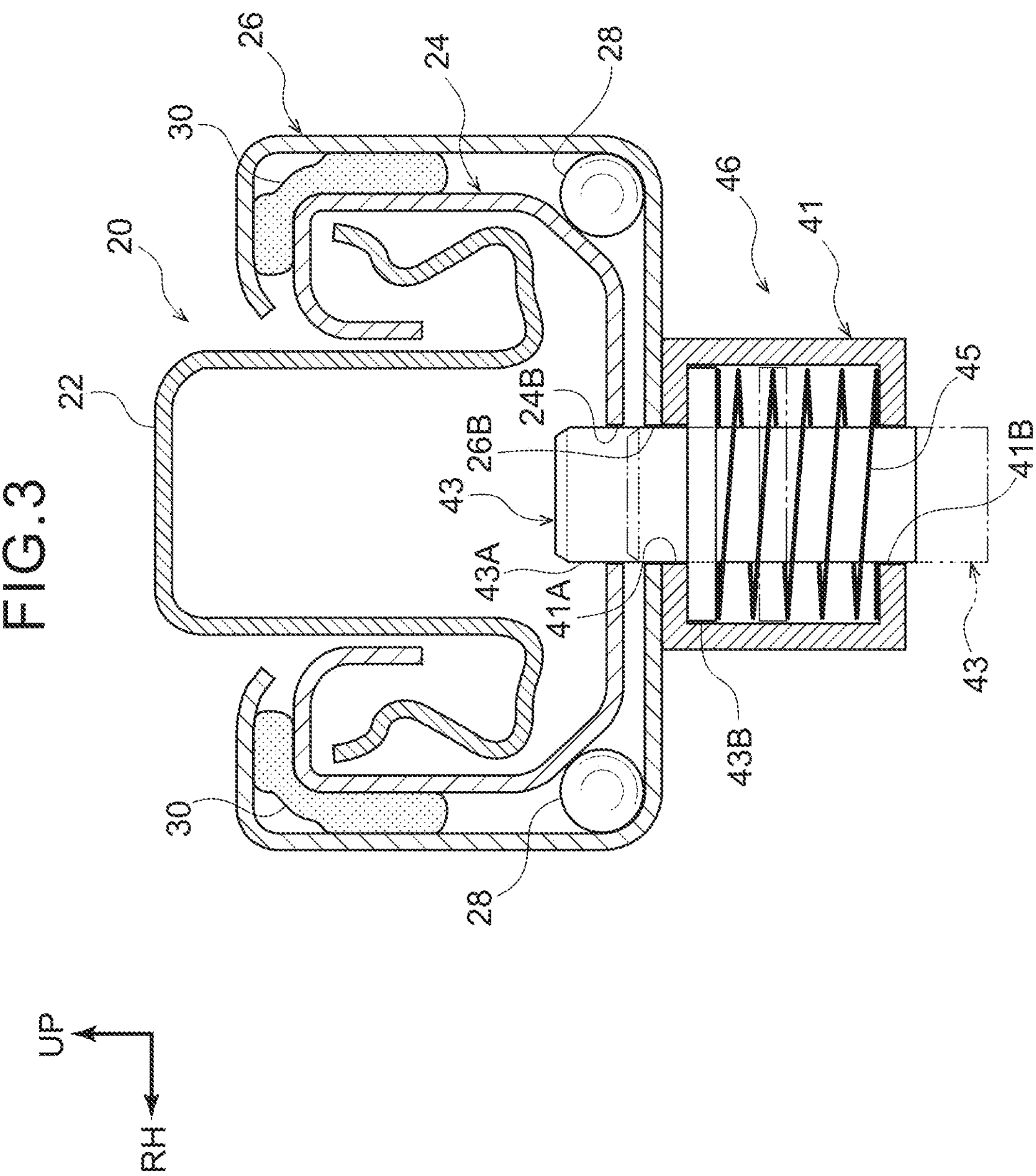
FIG. 3 is an enlarged sectional view that is seen from the vehicle front side and shows, in an enlarged manner, a locking mechanism in the first embodiment.

Locking mechanisms 46 are disposed at the rail guiding members 26. As shown in FIG. 3, as an example, the locking mechanism 46 of the present embodiment is structured to include a housing 41, a lock pin 43 and an compression coil spring 45.

The housing 41 is formed substantially in the shape of a box, and is fixed to the lower surface of the rail guiding member 26. An upper side through-hole 41A is formed in the upper surface of the housing 41, and a lower side through-hole 41B is formed in the lower surface of the housing 41.

The lock pin 43 is structured to include a shaft portion 43A and a flange portion 43B. The shaft portion 43A is formed substantially in the shape of a solid cylinder whose axial direction is the vehicle vertical direction. The upper portion of the shaft portion 43A is inserted-through the upper side through-hole 41A, and the lower portion of the shaft portion 43A is inserted-through the lower side through-hole 41B. The flange portion 43B is provided at a position that is offset further toward the upper side than the vertical direction intermediate portion of the shaft portion 43A. The flange portion 43B extends-out toward the outer side from the outer peripheral surface of the shaft portion 43A, and is formed to have a larger diameter than the upper side through-hole 41A and the lower side through-hole 41B. Therefore, the lock pin 43 can move up and down between a position at which the flange portion 43B contacts the upper surface of the housing 41 interior, and a position at which the flange portion 43B contacts the lower surface of the housing 41 interior.

The compression coil spring 45 is provided at the interior of the housing 41. The compression coil spring 45 is provided between the lower surface of the housing 41 and the flange portion 43B of the lock pin 43, and abuts the lower surface of the flange portion 43B and urges the flange portion 43B upward.

Here, in the state in which the flange portion 43B is urged upward by the compression coil spring 45, the lock pin 43 is inserted-through an anchor hole 26B that is formed in the rail guiding member 26. Further, the lock pin 43 is inserted-through an anchor hole 24B that is formed in the lower rail 24. Therefore, the lower rail 24 is locked so as to be unable to move forward and rearward with respect to the rail guiding member 26.

An unillustrated actuator such as a solenoid or the like is connected to the lock pin 43. Due to the actuator operating, the lock pin 43 is lowered against the urging force of the compression coil spring 45. Due thereto, as shown by the two-dot chain line in FIG. 3, the upper end portion of the lock pin 43 is pulled-out from the anchor hole 24B of the lower rail 24, and the locked state of the lower rail 24 is released.

Note that the present embodiment is structured such that the lower rails 24 are locked by the locking mechanisms 46 at driving positions that are shown in FIG. 4 and relaxation position that are shown in FIG. 5. Due to actuators being operated on the basis of a signal from an unillustrated control section such as an ECU (Electronic Control Unit) or the like, the locked states are released. Namely, the actuators are operated and the locked states are released in a case in which a front collision is detected or predicted by the ECU from a signal of a collision sensor or a collision predicting sensor or the like that is installed in the vehicle.

A deforming member 58 that serves as a damping mechanism is provided at the moving mechanism 48. The deforming member 58 of the present embodiment is formed by a metal member that is folded-over in a zigzag shape. One end side of the deforming member 58 is mounted to the cross member 44 via the fixed bracket 56. Another end portion of the deforming member 58 is mounted to the wire W.

Here, the deforming member 58 is structured so as to, by being tensed, plastically deform, and damp the inertial movement toward the vehicle front side of the slide rails 20 with respect to the rail guiding members 26.

(Operation) Operation of the present embodiment is described next by using FIGS. 6A and 6B.

Figure 6A:
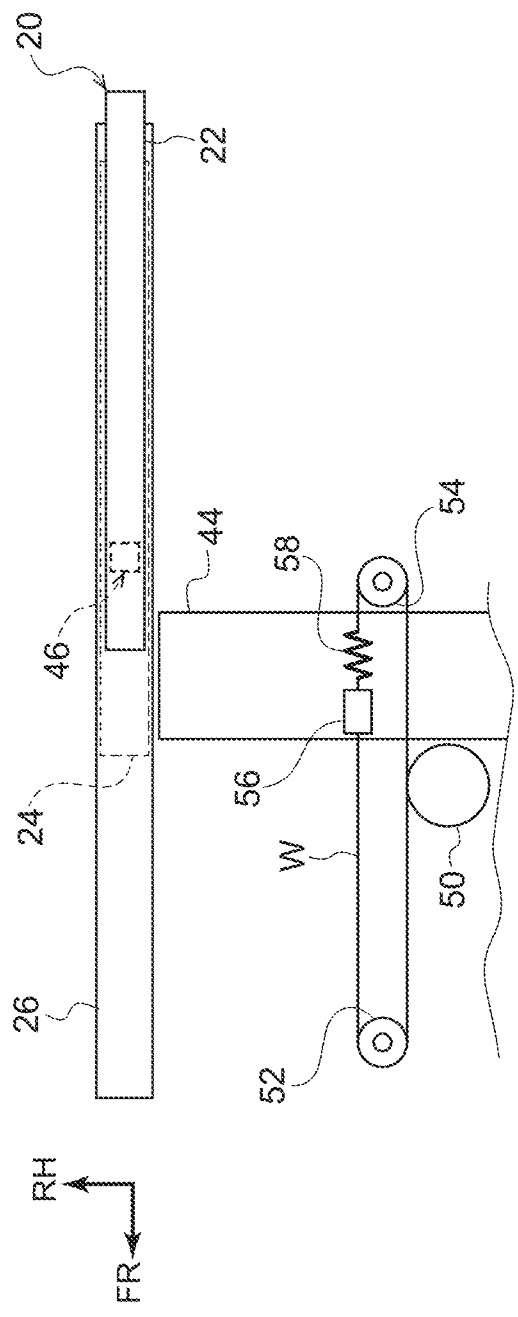
FIG. 6A is a schematic plan view showing a state before a front collision of a vehicle, at the seat sliding structure for a vehicle relating to the first embodiment.

A state in which the slide rails 20 are positioned at the relaxation position is shown in FIG. 6A. When, in this state, a front collision of the vehicle is detected or predicted, due to a signal from the control section, the actuators are operated, and the locked states of the lower rails 24 by the locking mechanisms 46 are released.

Due to the locked states of the lower rails 24 being released, the slide rails 20 inertially move toward the vehicle front side with respect to the rail guiding members 26. Due thereto, the slide rails 20 may be moved to the driving positions, and the vehicle occupant may be restrained by the restraining devices, such as the airbags for the driver's seat and the knee airbag and the like, which are provided at the vehicle.

Figure 6B:
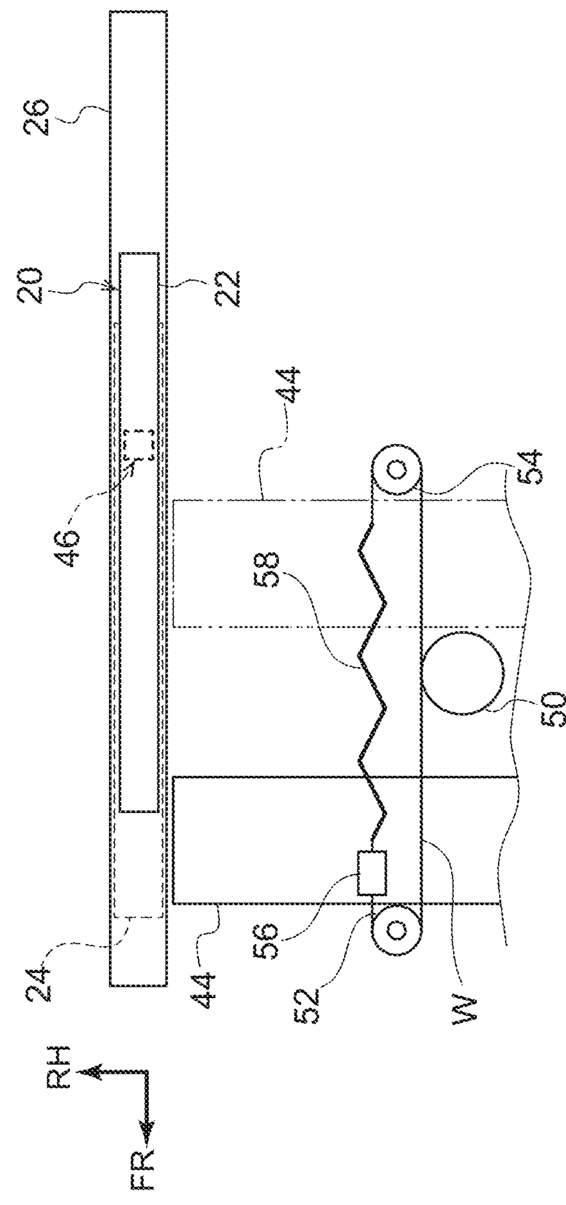
FIG. 6B is a schematic plan view showing a state after a front collision of the vehicle, at the seat sliding structure for a vehicle relating to the first embodiment.

Further, as shown in FIG. 6B, due to the slide rails 20 and the cross member 44 inertially moving toward the vehicle front side, the deforming member 58 is tensed in the vehicle longitudinal direction. Due thereto, the deforming member 58 is pulled and stretched toward the vehicle front side while plastically deforming, and damps the inertial movement of the slide rails 20 toward the vehicle front side. As a result, the collision load that is inputted to the vehicle occupant seated in the vehicle seat 10 may be kept to a minimum. Further, the reaction forces that are inputted to the vehicle occupant from the restraining devices may be reduced. Moreover, because the deforming member 58 of the present embodiment is mounted to the wire W, it is difficult for lateral force to arise thereat. Due thereto, it is difficult for problems with sliding that arise due to prying to occur, as compared with a structure that damps the inertial movement of the slide rails 20 by another structure such as a cam mechanism or the like.

Second Embodiment

A seat sliding structure for a vehicle relating to a second embodiment is described next. Note that structures that are similar to those of the first embodiment are denoted by the same reference numerals, and description thereof is omitted as appropriate.

Figure 7:
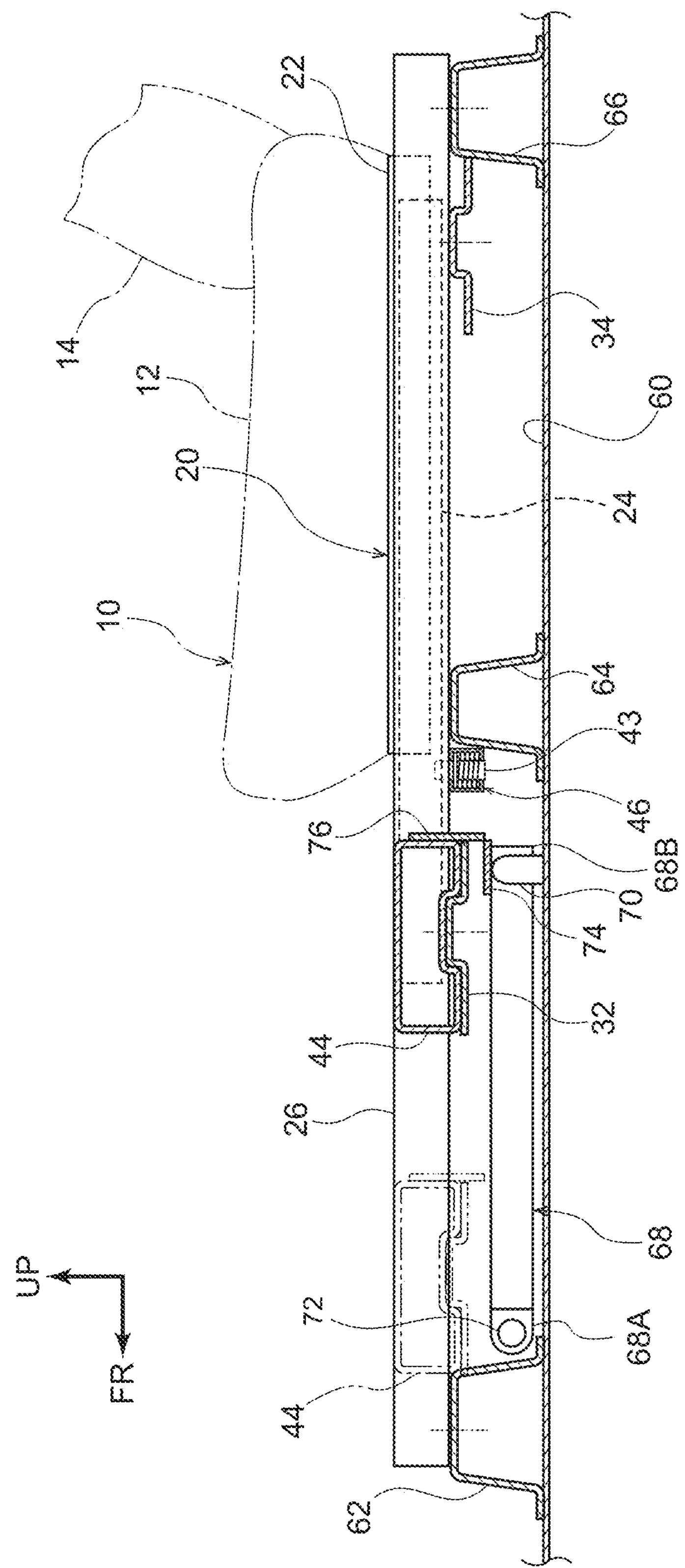
FIG. 7 is a cross-sectional view, which is seen from a vehicle transverse direction, showing the overall structure of a seat sliding structure for a vehicle relating to a second embodiment.

As shown in FIG. 7, in the same way as in the first embodiment, in the seat sliding structure for a vehicle of the present embodiment, the pair of left and right slide rails 20 are connected in the vehicle transverse direction by the cross member 44. Further, the cross member 44 moves in the vehicle longitudinal direction in conjunction with movement of the slide rails 20 in the vehicle longitudinal direction.

Here, the rail guiding members 26 in the present embodiment are fixed to a floor panel 60 via a front cross member 62, a middle cross member 64 and a rear cross member 66. The front cross member 62 is positioned beneath the front end portions of the rail guiding members 26, and is formed, in cross-section, in a substantial hat shape that opens toward the lower side as seen from the vehicle transverse direction. Flange portions at the front end and the rear end of the front cross member 62 are superposed on and joined to the floor panel 60. Further, the front end portions of the rail guiding members 26 are fastened to the upper surface of the front cross member 62.

The middle cross member 64 is positioned beneath the vehicle longitudinal direction intermediate portions of the rail guiding members 26, and is formed, in cross-section, in a substantial hat shape that opens toward the lower side as seen from the vehicle transverse direction. Flange portions at the front end and the rear end of the middle cross member 64 are superposed on and joined to the floor panel 60. Further, the rail guiding members 26 are supported by the upper surface of the middle cross member 64.

The rear cross member 66 is positioned beneath the rear end portions of the rail guiding members 26, and is formed, in cross-section, in a substantial hat shape that opens toward the lower side as seen from the vehicle transverse direction. Flange portions at the front end and the rear end of the rear cross member 66 are superposed on and joined to the floor panel 60. Further, the rear end portions of the rail guiding members 26 are fastened to the upper surface of the rear cross member 66.

Here, a rod 68 is provided further toward the lower side than the rail guiding member 26. The rod 68 is disposed between the front cross member 62 and the middle cross member 64, and extends in the vehicle longitudinal direction. In the present embodiment, as an example, the rod 68 is formed by an extrusion molded part of a resin material or aluminum. A front end portion 68A of the rod 68 is mounted so as to be able to rotate around a shaft portion 72 whose axial direction is the vehicle transverse direction. A rear end portion 68B of the rod 68 is a free end, and is positioned beneath the rear end portion of the cross member 44 in the state in which the slide rails 20 are at the relaxation position. Note that the rod 68 may be formed in a shape that is such that the front end portion 68A side thereof is wider than the rear end portion 68B side.

A supporting plate 74 that is substantially flat plate shaped is fixed to the upper surface of the rear end portion 68B of the rod 68. The supporting plate 74 extends in the vehicle transverse direction from the rod 68. A pop-up device 70 is disposed beneath the supporting plate 74.

The pop-up device 70 stands upright on the floor panel 60. The pop-up device 70 is structured so as to move upward (pop-up) by being operated, and, in the present embodiment, as an example, pops-up due to gas being generated at the interior thereof. Note that, other than a gas-type structure that is popped-up by gas, an electric structure that is popped-up due to current flowing thereto, an explosive-type structure that is popped-up due to an explosive, or the like may be employed for the pop-up device 70.

Here, the pop-up devices 70 are structured so as to, on the basis of a signal from the ECU that is the control section, operate in a case in which the slide rails 20 are at the relaxation position and a front collision of the vehicle is detected or predicted.

Rod receiving portions 76 are provided at the rear surface of the cross member 44. The rod receiving portions 76 are fixed to the rear surface of the cross member 44 with the thickness directions thereof being the vehicle longitudinal direction, and are provided slightly further toward the vehicle rear side than the rear ends of the rods 68. The rod receiving portions 76 extend further toward the lower side than the lower end of the cross member 44. In the present embodiment, the damping mechanism is structured to include the rods 68, the pop-up devices 70 and the rod receiving portions 76. The rod receiving portions 76 engage with the rear end portions 68B of the rods 68 that have moved upward, and, in conjunction with inertial movement of the slide rails 20 toward the vehicle front side, crush the rods 68 in the axial direction.

(Operation) Operation of the present embodiment is described next.

As shown in FIG. 7, the pop-up devices 70 are operated in a case in which a front collision is detected or predicted by the ECU from a signal from a collision sensor or a collision predicting sensor or the like that is installed in the vehicle, in the state in which the slide rails 20 are at the relaxation position.

Figure 8:
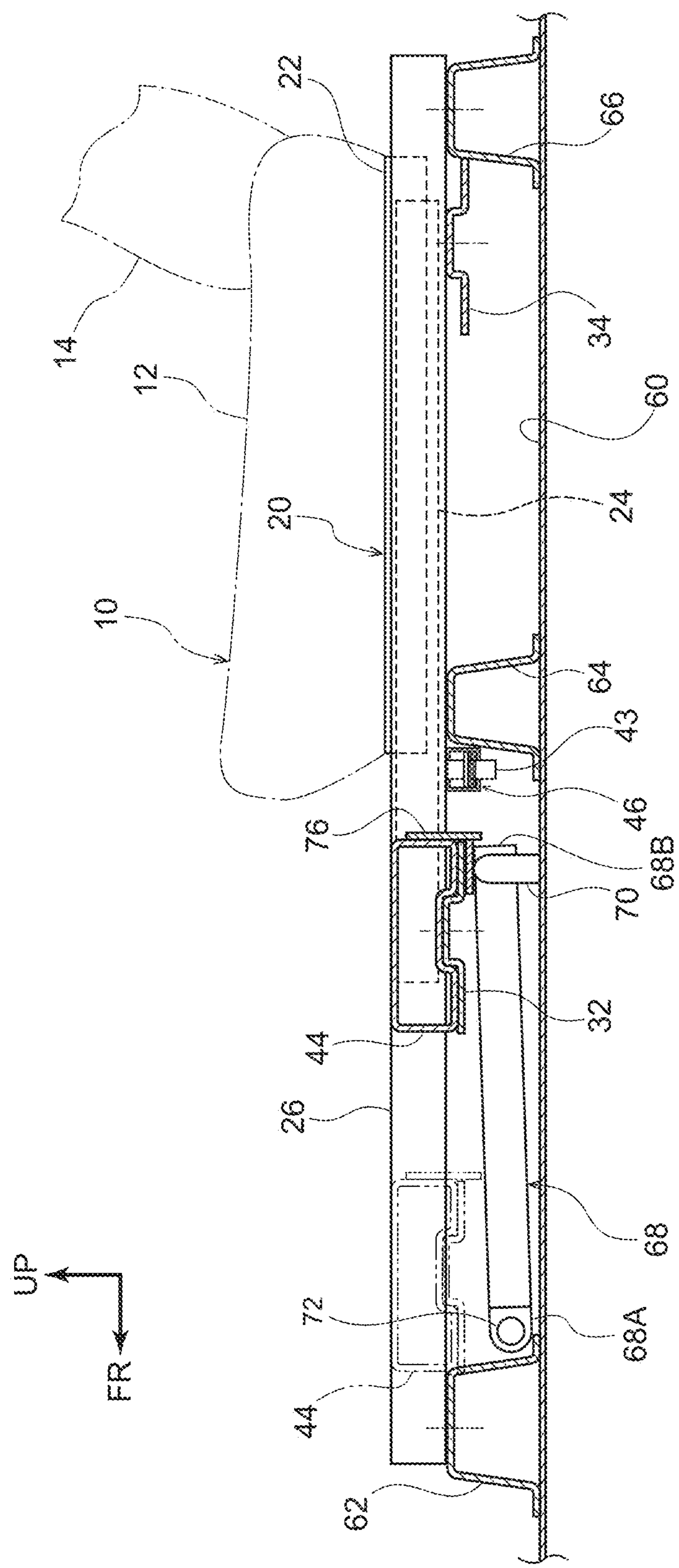
FIG. 8 is a cross-sectional view, which is seen from a vehicle transverse direction, showing the overall structure of the seat sliding structure for a vehicle in a case in which a rod has popped-up from the state of FIG. 7.

As shown in FIG. 8, due to the pop-up device 70 being operated, the rear end portion 68B of the rod 68 is pushed-up via the supporting plate 74. Due thereto, the rear end portion 68B of the rod 68 and the rod receiving portion 76 engage.

Namely, the rod receiving portion 76 and the rod 68 are disposed at overlapping positions as seen from the vehicle longitudinal direction, and input of load from the rod receiving portion 76 to the rod 68 becomes possible.

On the other hand, at the time when a front collision of the vehicle is detected or predicted, due to the lock pins 43 of the locking mechanisms 46 being lowered, the locked states of the lower rails 24 are released. Due thereto, the slide rails 20 are inertially moved from the relaxation position toward the vehicle front side.

Figure 9:
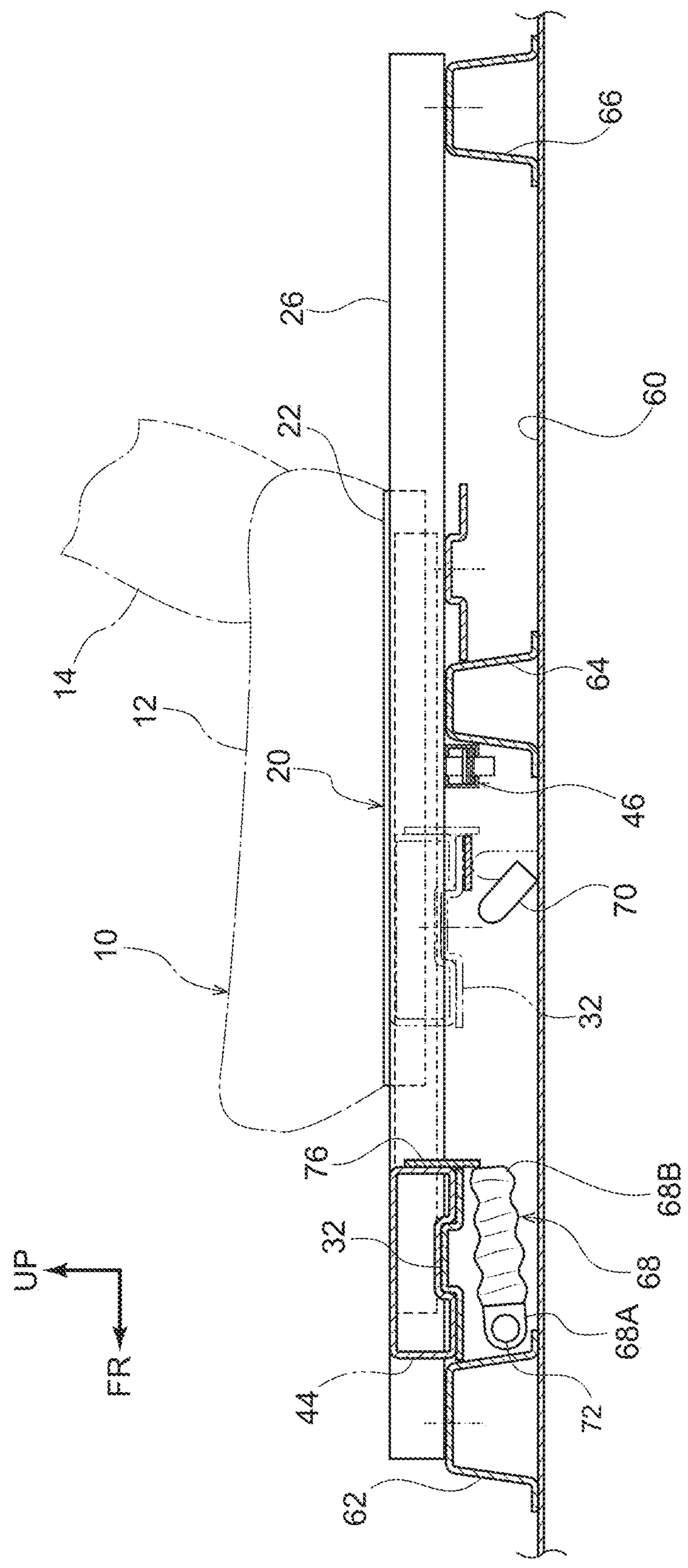
FIG. 9 is a cross-sectional view, which is seen from the vehicle transverse direction, showing the overall structure of the seat sliding structure for a vehicle in a case in which a vehicle seat has moved inertially toward the seat front side from the state of FIG. 8.

Here, because the cross member 44 is inertially moved toward the vehicle front side together with the slide rails 20, load is inputted from the rod receiving portions 76 to the rods 68. Then, as shown in FIG. 9, the rods 68 are crushed in the axial direction, and the inertial movement of the slide rails 20 may be damped.

In the present embodiment, the degree to which the inertial movement of the slide rail 20 is damped may be adjusted by changing the length, the material, and the like of the rod 68.

Note that, although the present embodiment is structured such that the rear end portion 68B of the rod 68 is pushed-up due to the pop-up device 70 being operated, the present disclosure is not limited to this. For example, the structure of the modified example that is illustrated in FIG. 10 and FIG. 11 may be employed.

Modified Example

Figure 10:
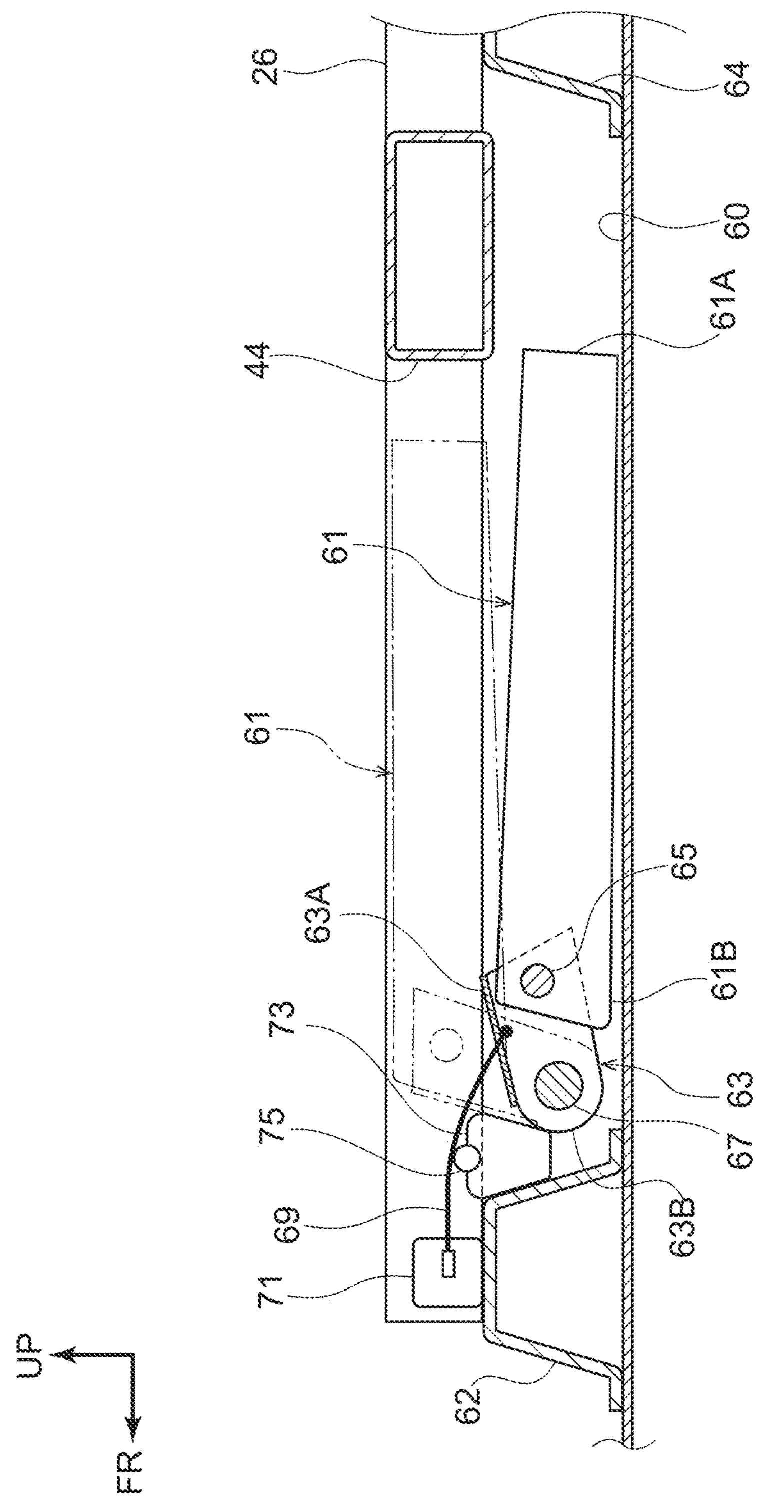
FIG. 10 is a cross-sectional view that corresponds to FIG. 7 and shows a modified example of the seat sliding structure for a vehicle relating to the second embodiment.
Figure 11:
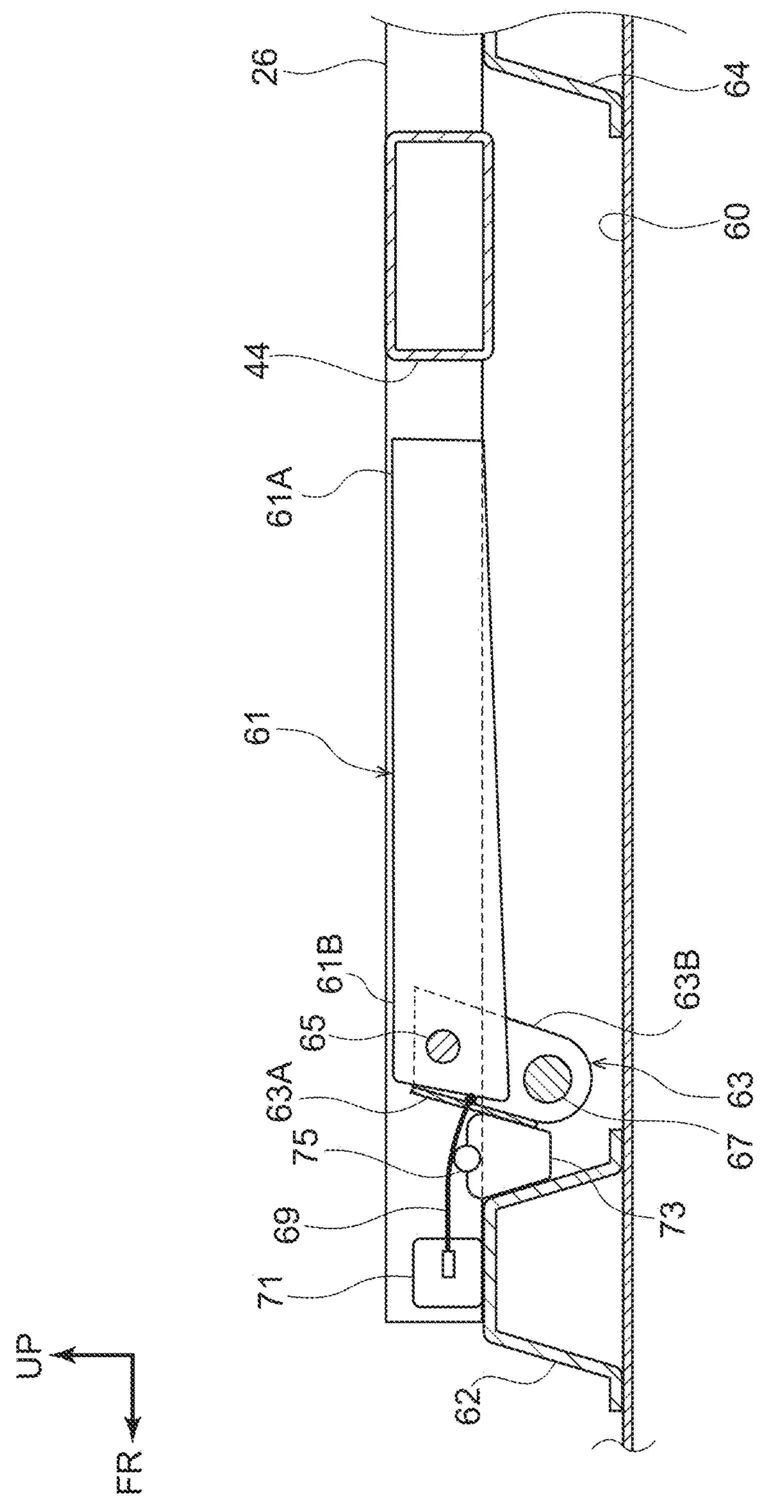
FIG. 11 is a cross-sectional view that corresponds to FIG. 10 and shows a state in which a rod has popped-up from the state of FIG. 10.

As shown in FIG. 10, in the present modified example, a rod 61 is disposed between the front cross member 62 and the middle cross member 64. The rod 61 is formed such that the sectional surface area of a front end portion 61B thereof is greater than that of a rear end portion 61A, and the rod 61 is formed by an extrusion molded part of a resin material or aluminum.

Here, a link 63 is rotatably connected via a first supporting shaft 65 to the front end portion 61B of the rod 61. The link 63 is structured to include a lateral wall portion 63A that extends in the vehicle transverse direction, and vertical wall portions 63B that extend-out from the both ends of the lateral wall portion 63A. The cross-section of the link 63 as seen from the vehicle longitudinal direction is substantially U-shaped. Only the vertical wall portion 63B that is at the vehicle right side is illustrated in FIG. 10 and FIG. 11. Further, the first supporting shaft 65 and a second supporting shaft 67 are provided between the vertical wall portions 63B of the link 63. The first supporting shaft 65 extends in the vehicle transverse direction at one end side of the link 63 and connects the vertical wall portions 63B together. The second supporting shaft 67 extends in the vehicle transverse direction at another end side of the link 63 and connects the vertical wall portions 63B together. The first supporting shaft 65 is rotatably inserted-through the front end portion 61B of the rod 61, and the second supporting shaft 67 is inserted-through an unillustrated shaft receiving portion.

A driving device 71 is provided at the upper portion of the front cross member 62. An inflator and a solenoid and the like may be used as the driving device 71. One end of a wire 69 is connected to the driving device 71. Another end of the wire 69 is mounted to the link 63.

A stopper 73 is mounted to the vehicle rear side wall surface of the front cross member 62. The stopper 73 is positioned between the front cross member 62 and the link 63. At the time when the link 63 rotates toward the front side around the second supporting shaft 67, the stopper 73 stops the lateral wall portion 63A of the link 63 at a predetermined angle. Further, a pulley 75 is provided at the upper portion of the stopper 73, and the wire 69 is trained around this pulley 75.

Here, at the time when a front collision of the vehicle is detected or predicted, the driving device 71 is operated, and the wire 69 is pulled-in. Therefore, due to the driving device 71 being operated, tension is imparted to the wire 69, and the link 63 is rotated toward the front side. Accompanying this, the rod 61 is moved upward via the first supporting shaft 65. Namely, the pop-up device is structured to include the driving device 71 and the wire 69.

As shown in FIG. 11, due to the rod 61 being moved upward, the rear end portion 61A of the rod 61 is disposed so as to face the cross member 44 in the vehicle longitudinal direction. Due thereto, the cross member 44, which inertially moves toward the vehicle front side due to a front collision, abuts the rods 61 and crushes the rods 61 in the axial direction. Namely, in the present modified example, the cross member 44 functions as a rod receiving portion. In this way, the inertial movement of the slide rails 20 may be damped.

Third Embodiment

A seat sliding structure for a vehicle relating to a third embodiment is described next. Note that structures that are similar to those of the first embodiment are denoted by the same reference numerals, and description thereof is omitted as appropriate.

Figure 12:
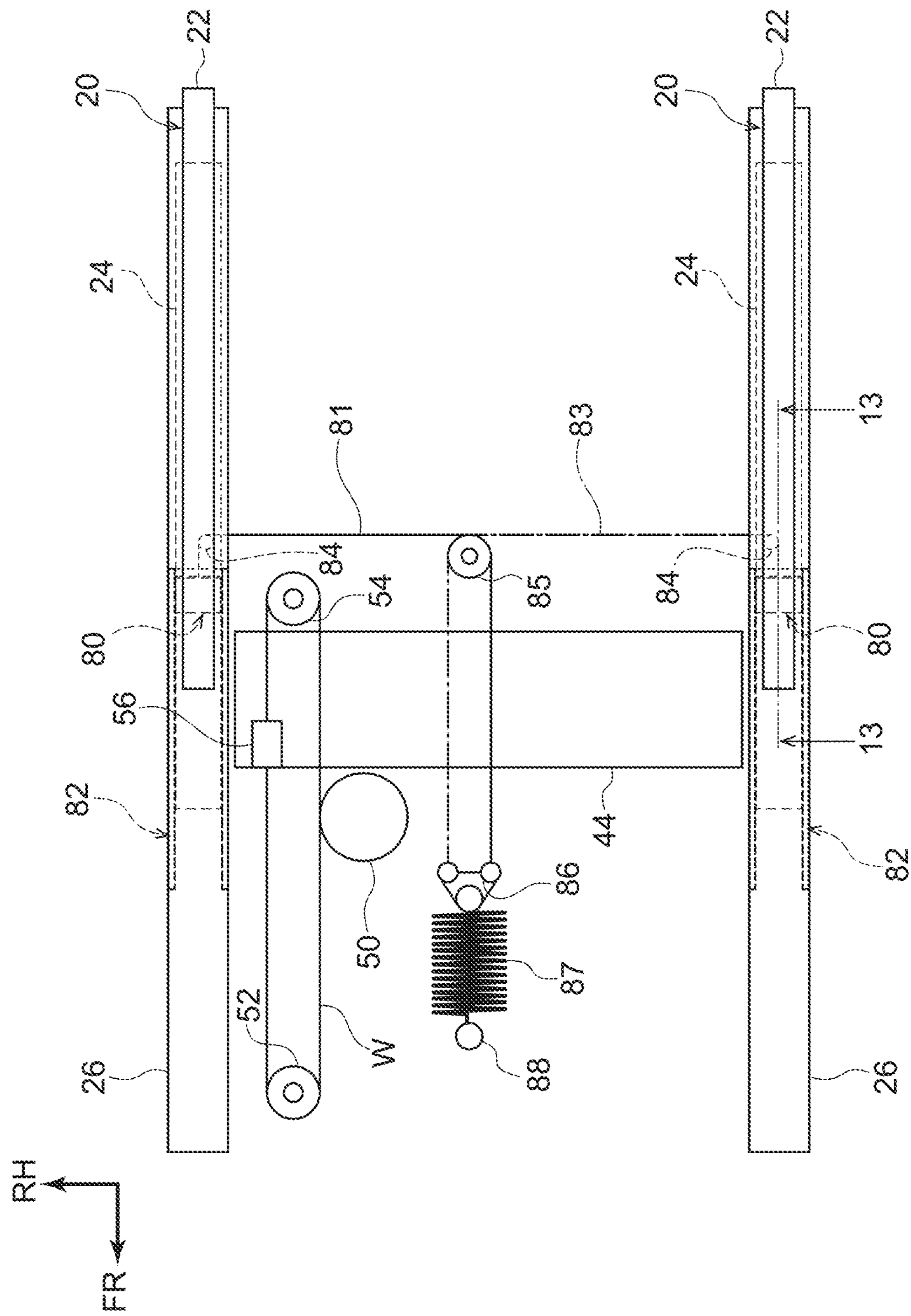
FIG. 12 is a schematic plan view that schematically shows the overall structure of a seat sliding structure for a vehicle relating to a third embodiment.

As shown in FIG. 12, in the seat sliding structure for a vehicle of the present embodiment, the slide rail 20 is structured to include the upper rail 22 that is disposed at the upper side and the lower rail 24 that is disposed at the lower side, and the rail guiding member 26 is provided at the outer side of the slide rail 20. Here, a moving body 80 is disposed beneath the rail guiding member 26.

Figure 13:
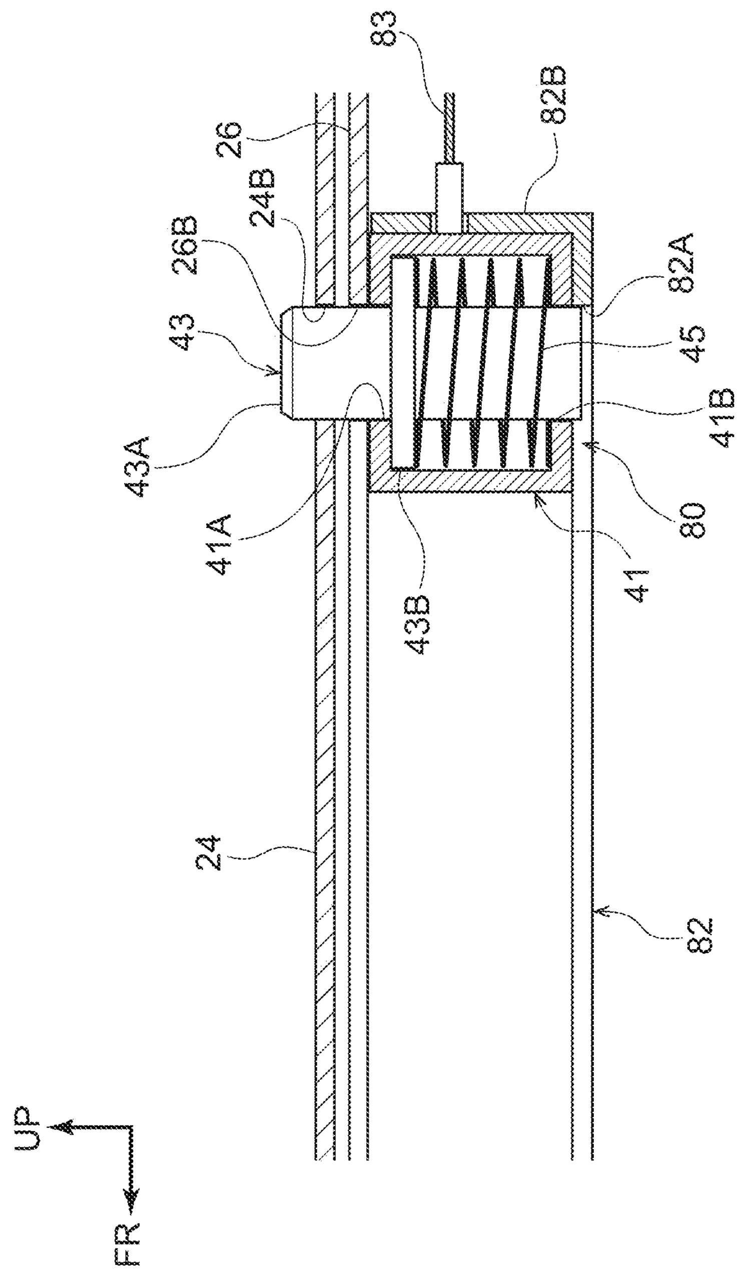
FIG. 13 is an enlarged sectional view showing, in an enlarged manner, the state cut along line 13-13 of FIG. 12.

As shown in FIG. 13, the moving body 80 is structured similarly to the locking mechanism 46 of the first embodiment, and is structured to include the housing 41, the lock pin 43 and the compression coil spring 45. Further, the moving body 80 is supported from the vehicle lower side by a lock guiding rail 82.

The lock guiding rail 82 extends in the vehicle longitudinal direction along the rail guiding member 26, and the cross-section thereof, which is viewed from the vehicle longitudinal direction, is formed in a substantial U-shape that opens upward. Further, the upper end portion of the lock guiding rail 82 is fixed to the lower surface of the rail guiding member 26. The moving body 80 is supported at the bottom portion of the lock guiding rail 82 so as to be slidable in the vehicle longitudinal direction.

A slit 82A is formed in the bottom portion of the lock guiding rail 82 in the vehicle longitudinal direction. The lock pin 43 of the moving body 80 is disposed in this slit 82A. A stopper 82B is formed at the rear end portion of the lock guiding rail 82. The stopper 82B extends-out upward from the bottom portion of the lock guiding rail 82 and anchors the moving body 80. Namely, due to the stopper 82B, the moving body 80 does not move further rearward than the lock guiding rail 82.

The housing 41 of the moving body 80 is formed substantially in the shape of a box. The shaft portion 43A of the lock pin 43 is inserted through the upper side through-hole 41A that is formed in the upper surface of the housing 41, and through the lower side through-hole 41B that is formed in the lower surface.

Further, the shaft portion 43A of the lock pin 43 is inserted-through the rail guiding member 26 and the lower rail 24, and the flange portion 43B of the lock pin 43 is urged upward by the compression coil spring 45. An unillustrated actuator such as a solenoid or the like is connected to the lock pin 43. Due to the actuator operating, the lock pin 43 is lowered against the urging force of the compression coil spring 45. Due thereto, the upper end portion of the lock pin 43 is pulled-out from the anchor hole 24B of the lower rail 24.

A wire 83 is mounted to the rear surface of the housing 41 of the moving body 80. As shown in FIG. 12, the wire 83, which extends rearward from the moving body 80 that is at the vehicle left side, is trained around a side pulley 84 and extends toward the vehicle right side. On the other hand, a wire 81, which is similar to the wire 83, is mounted to the moving body 80 that is at the vehicle right side. This wire 81 is trained around the side pulley 84 and extends toward the vehicle left side.

A center pulley 85 is disposed between the pair of left and right side pulleys 84. The center pulley 85 has up/down bi-level rollers (i.e., an upper roller and a lower roller). The wire 83 is trained around one of the rollers of the center pulley 85. The wire 81 is trained around the other roller of the center pulley 85. The wire 83 and the wire 81 extend toward the vehicle front side and are connected to a joint 86. Note that a cylindrical body whose surface has a low coefficient for friction may be used instead of the center pulley 85. In this case, because the wire 83 and the wire 81 move by sliding on the surface of the cylindrical body, there is no need for an up/down bi-level structure.

A deforming member 87 that serves as an energy absorbing member is mounted to the joint 86. The deforming member 87 is a member that is plastically deformed by being pulled and stretched, and is formed of a metal member that is folded-over in a zigzag shape. One end portion of this deforming member 87 is fixed to the joint 86, and the other end portion of the deforming member 87 is fixed to an anchor 88. Because the anchor 88 is fixed to the vehicle body, the deforming member 87 is pulled and stretched in the vehicle longitudinal direction due to the joint 86 being moved toward the vehicle rear side.

A predetermined tension is imparted to the wire 83 and the wire 81, and the moving body 80 is urged toward the vehicle rear side by this tension. Therefore, as shown in FIG. 13, the moving body 80 is tensed toward the vehicle rear side 83 by the wire 83, and anchors on the stopper 82B. The tension of the wire 83 and the wire 81 is set to a tension that is lower than the tension that is needed to pull and stretch the deforming member 87. Therefore, in the present embodiment, the wire 83 and the wire 81 function as locking mechanisms that lock the movement of the slide rails 20 at the relaxation position, and release the locked states at the time of a front collision of the vehicle.

Further, in the present embodiment, a damping mechanism is structured by the moving body 80 and the deforming member 87. Due to the deforming member 87 being plastically deformed, inertial movement of the slide rails 20 from the relaxation position toward the vehicle front side at the time of a front collision of the vehicle is damped.

(Operation)

Operation of the present embodiment is described next.

A state in which the slide rails 20 are at the relaxation position is shown in FIG. 12. In this state, in a case in which the vehicle is involved in a front collision, the slide rails 20 inertially move toward the vehicle front side with respect to the rail guiding members 26.

Figure 15:
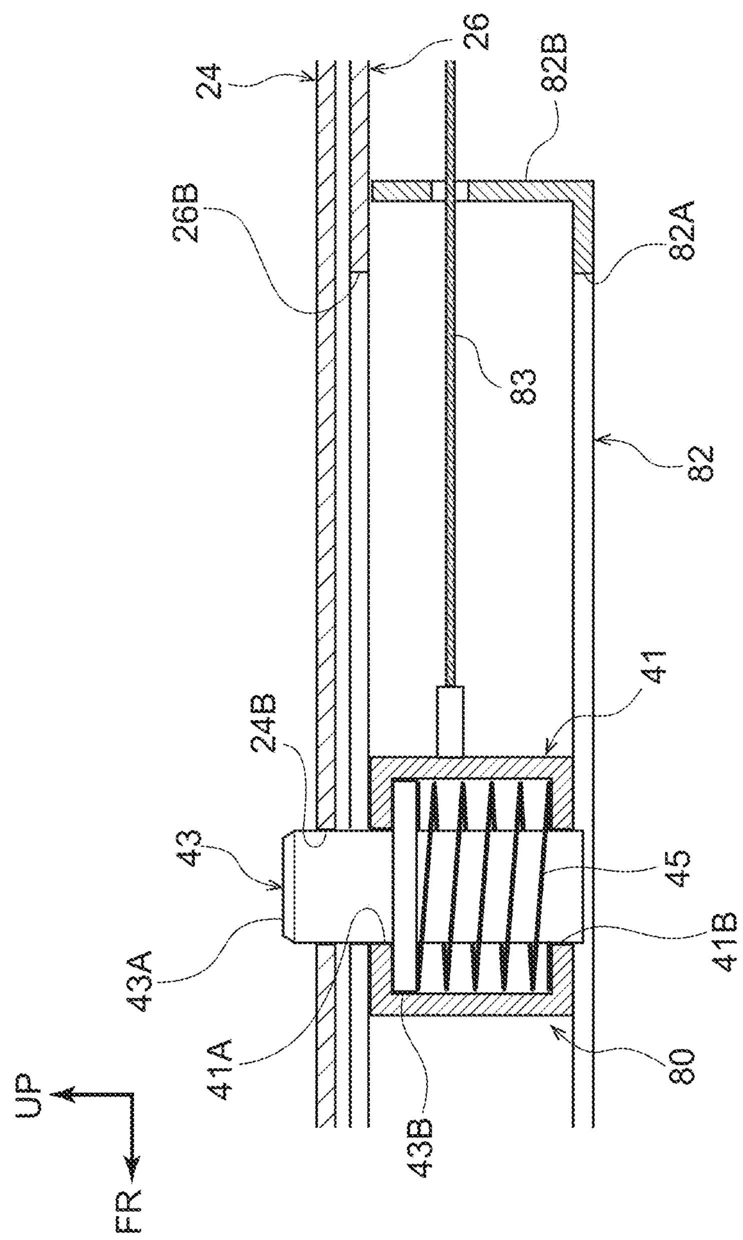
FIG. 15 is an enlarged sectional view showing, in an enlarged manner, the state cut along line 15-15 of FIG. 14.

At this time, as shown in FIG. 15, because the lock pins 43 of the moving bodies 80 are in states of being inserted through the anchor holes 24B of the lower rails 24, the moving bodies 80 are moved toward the vehicle front side integrally with the lower rails 24.

Figure 14:
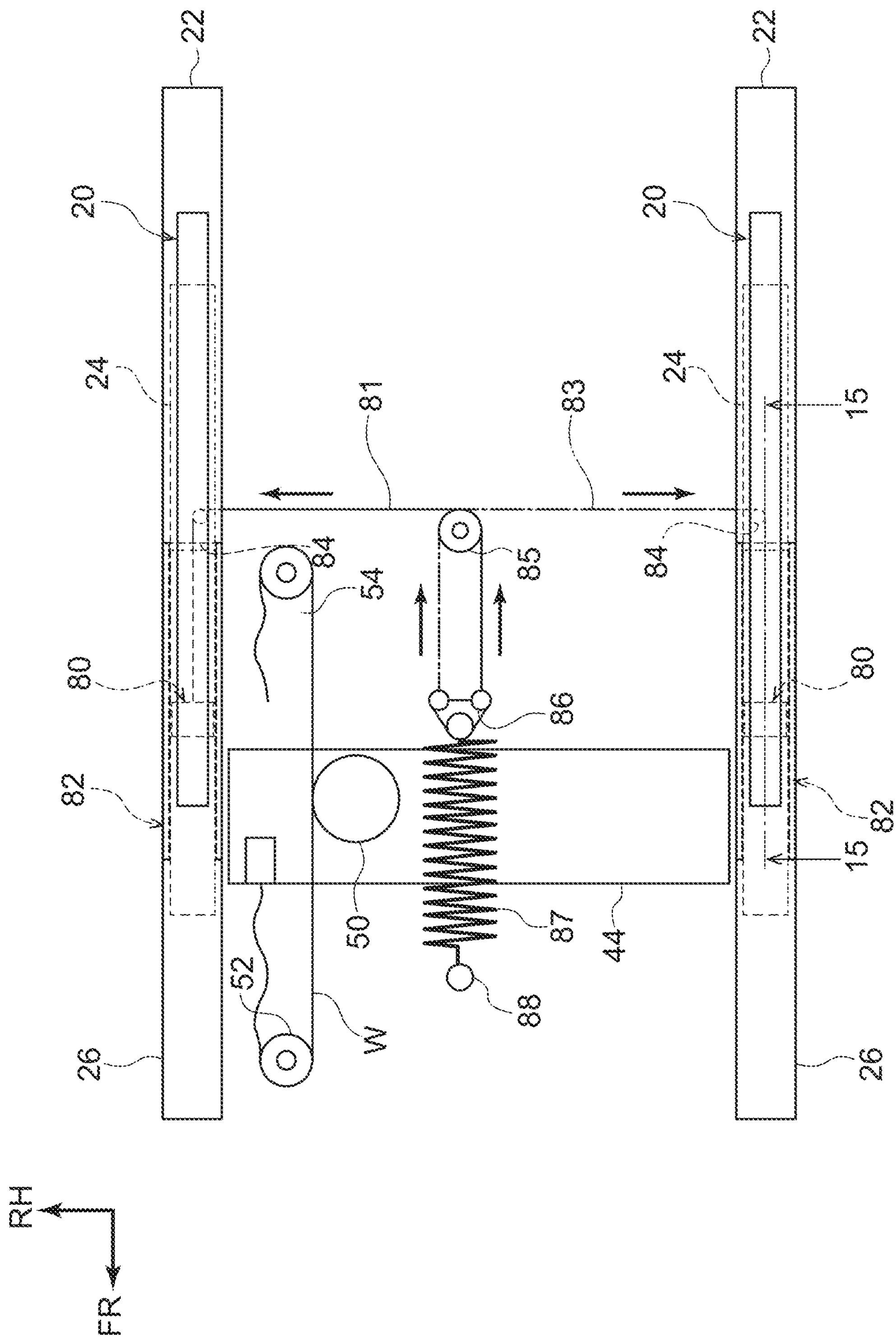
FIG. 14 is a schematic plan view showing the overall structure of the seat sliding structure for a vehicle in a case in which the vehicle seat has moved inertially toward the vehicle front side from the state of FIG. 12.

As shown in FIG. 14, due to the moving bodies 80 moving toward the vehicle front side, the wire 83 and the wire 81 are tensed toward the vehicle front side. Due thereto, the deforming member 87, which is connected via the wires 83 and the wire 81, is pulled and stretched, and is plastically deformed. On the other hand, the wire W, which is trained between the front side pulley 52 and the rear side pulley 54, is broken. As a result, the deforming member 87 may be plastically deformed in conjunction with inertial movement of the moving bodies 80 toward the vehicle front side, and the inertial movement of the slide rails 20 toward the vehicle front side may be damped.

Further, in the present embodiment, even at the time of a front collision, the locked states of the lower rails 24 and the lock pins 43 of the moving bodies 80 are not released. Due thereto, a part that is exclusively used for releasing the locked states at the time when a front collision is detected or predicted is not needed. Other operations are similar to those of the first embodiment.

Fourth Embodiment

A seat sliding structure for a vehicle relating to a fourth embodiment is described next. Note that structures that are similar to those of the first embodiment and the third embodiment are denoted by the same reference numerals, and description thereof is omitted as appropriate.

Figure 16:
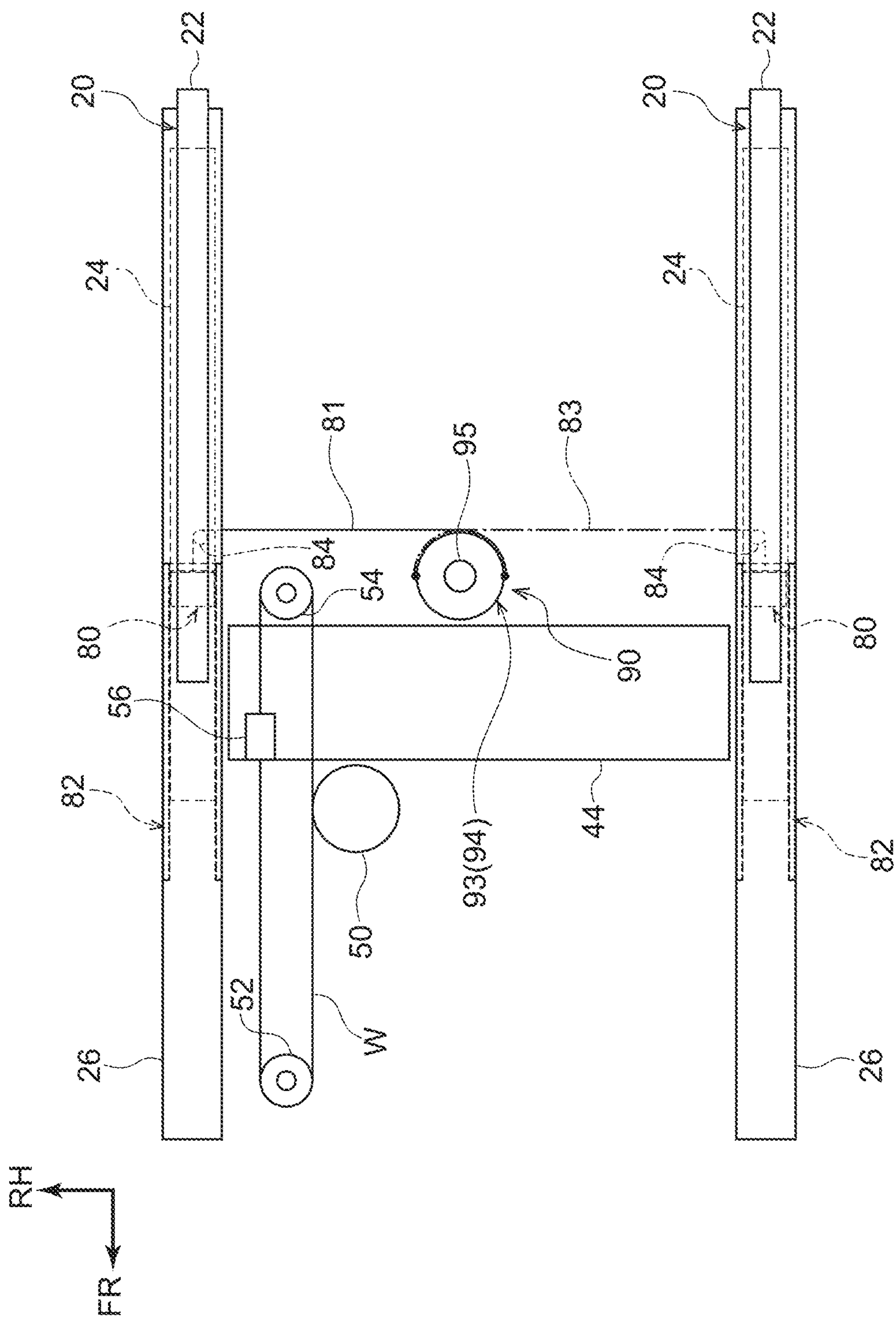
FIG. 16 is a schematic plan view that schematically shows the overall structure of a seat sliding structure for a vehicle relating to a fourth embodiment.

As shown in FIG. 16, in the seat sliding structure for a vehicle of the present embodiment, a rotating mechanism 90 is provided in place of the deforming member 87 of the third embodiment. The wire 83 and the wire 81 are attached to the rotating mechanism 90.

Figure 17:
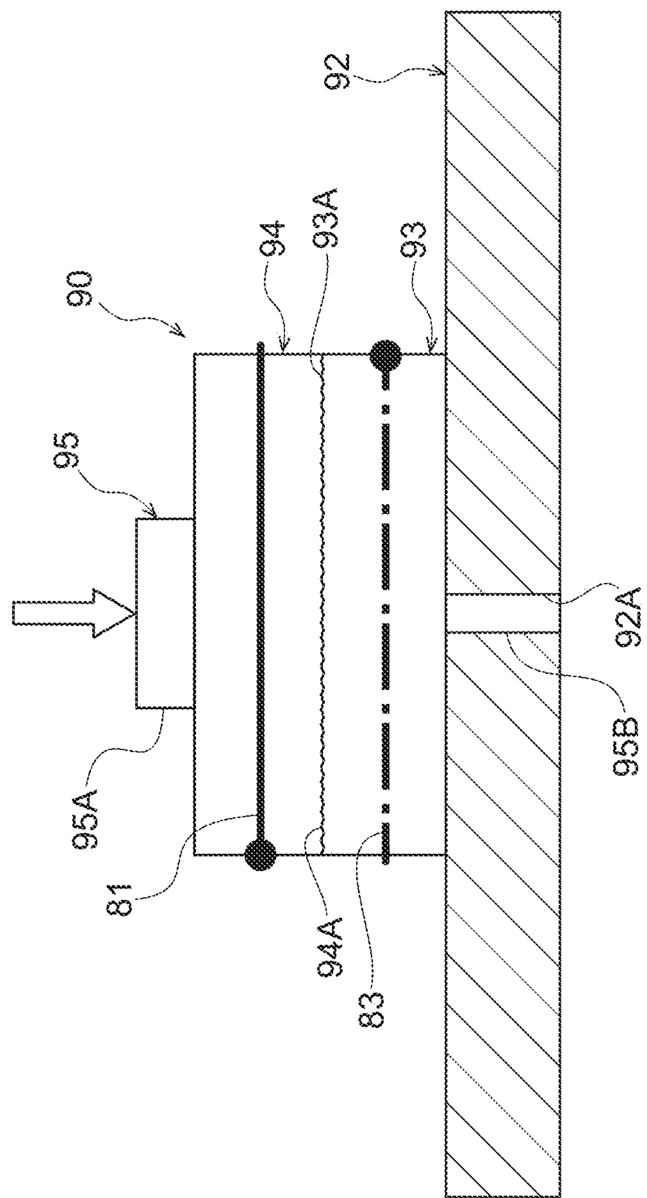
FIG. 17 is an enlarged rear view of main portions in which an energy absorbing member of the fourth embodiment is seen from a vehicle rear side and is illustrated in an enlarged manner.

As shown in FIG. 17, the rotating mechanism 90 is structured to include a base 92, a first disc 93, a second disc 94 and a center pin 95. An energy absorbing member is structured to include the first disc 93 and the second disc 94.

The base 92 is a member that is shaped as a flat plate, and is fixed to the floor panel with the vehicle vertical direction being the thickness direction thereof. A through-hole 92A is formed in the central portion of the base 92, and the center pin 95 that is described later is inserted in this mounting hole 92A.

The first disc 93 and the second disc 94 are stacked on the base 92. The first disc 93 is placed on the upper surface of the base 92, and is formed in a substantially circular shape as seen in a plan view. An unillustrated insert-through hole is formed in the central portion of the first disc 93, and the center pin 95 is inserted through this insert-through hole. Innumerable projections are formed in an upper surface 94A of the first disc 93, and the upper surface 94A is uneven.

The second disc 94 is placed on the first disc 93, and, as seen in a plan view, is formed substantially in the shape of a circle that has the same diameter as the first disc 93. An unillustrated insert-through hole is formed in the central portion of the second disc 94, and the center pin 95 is inserted through this insert-through hole. Moreover, innumerable projections are formed in a lower surface 93A of the second disc 94, and the lower surface 93A is uneven. Therefore, the upper surface 94A of the first disc 93 and the lower surface 93A of the second disc 94, which are uneven, are disposed so as to face one another.

The center pin 95 has a head portion 95A and a shaft portion 95B. The head portion 95A is formed to have a larger diameter than the insert-through holes that are formed in the first disc 93 and the second disc 94. The shaft portion 95B of the center pin 95 extends downward from the head portion 95A, and is inserted-through the first disc 93 and the second disc 94, and is inserted in and fixed to the mounting hole 92A that is formed in the base 92. Note that the shaft portion 95B of the center pin 95 is made to have a smaller diameter than the insert-through holes that are respectively formed in the first disc 93 and the second disc 94, and is structured so as to not impede the rotation of the first disc 93 and the second disc 94.

In the present embodiment, the head portion 95A of the center pin 95 is pushed-in toward the base 92 side, and holds the first disc 93 and the second disc 94 in states of being pushed-against the base 92. Therefore, the state in which the upper surface 94A of the first disc 93 and the lower surface 93A of the second disc 94 closely contact one another is maintained.

Here, an end portion of the wire 83 is fixed to the first disc 93. Further, an end portion of the wire 81 is fixed to the second disc 94. Therefore, due to the wire 83 being tensed, the first disc 93 rotates around the center pin 95. Further, due to the wire 81 being tensed, the second disc 94 rotates in the direction opposite the first disc 93.

(Operation)

Operation of the present embodiment is described next.

A state in which the slide rails 20 are at the relaxation position is shown in FIG. 16. In this state, in a case in which the vehicle is involved in a front collision, the slide rails 20 move inertially toward the vehicle front side with respect to the rail guiding members 26. At this time, the moving bodies 80 are moved toward the vehicle front side integrally with the lower rails 24.

Figure 18:
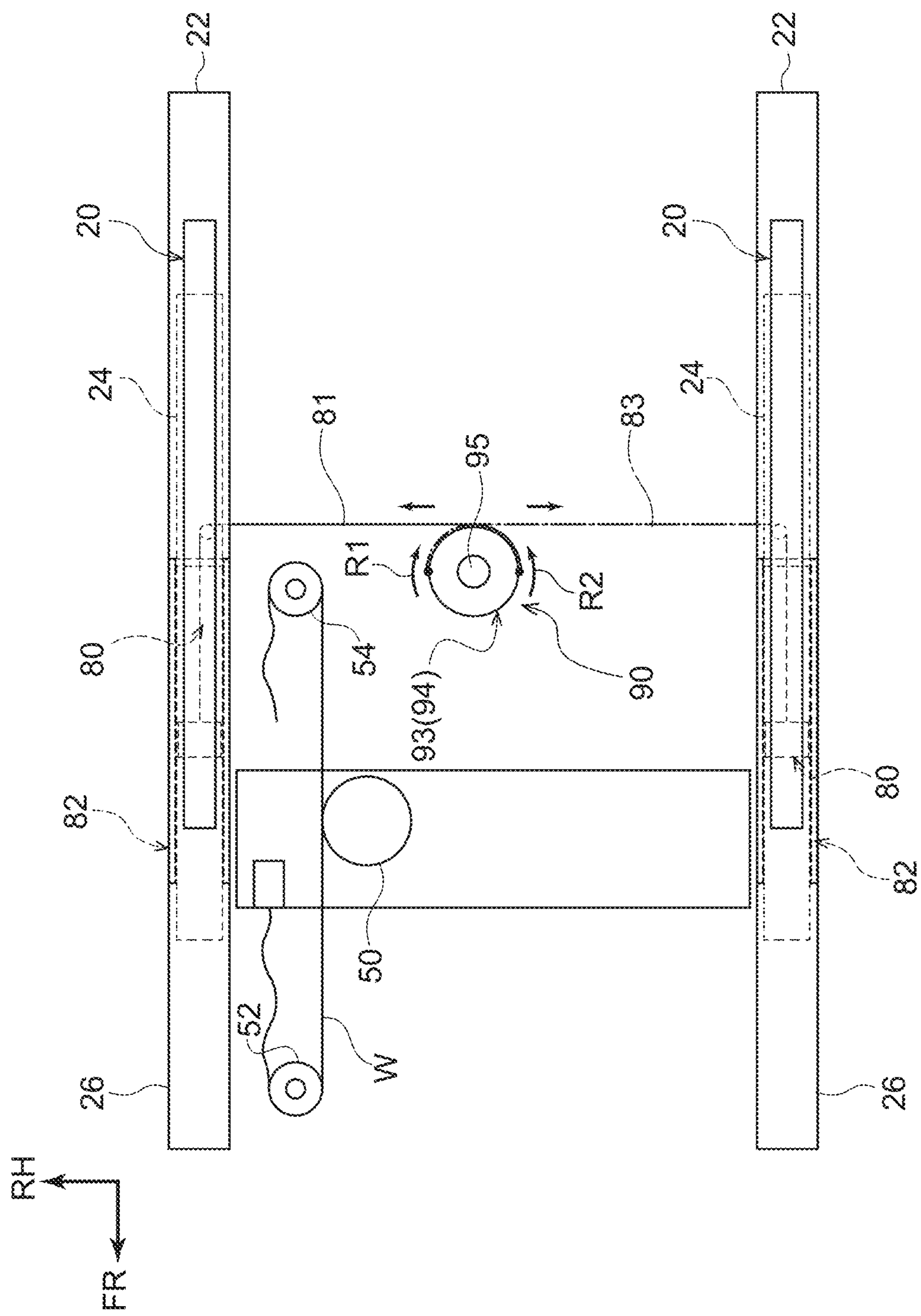
FIG. 18 is a schematic plan view showing the overall structure of the seat sliding structure for a vehicle in a case in which the vehicle seat has moved inertially toward the seat front side from the state of FIG. 16.

As shown in FIG. 18, due to the moving bodies 80 moving toward the vehicle front side, the wire 83 and the wire 81 are tensed toward the vehicle front side. Due thereto, the first disc 93 that is connected to the wire 83 is rotated in the direction of R1 in the drawing. On the other hand, the second disc 94 that is connected to the wire 81 is rotated in the direction of R2 in the drawing. Namely, the first disc 93 and the second disc 94 are rotated in directions opposite one another. On the other hand, the wire W, which is trained between the front side pulley 52 and the rear side pulley 54, is broken. Due thereto, frictional resistance arises at the planarly contacting portions of the first disc 93 and the second disc 94 shown in FIG. 17, and the inertial movement of the slide rails 20 toward the vehicle front side may be damped. Other operations are similar to those of the first embodiment.

Note that, in the present embodiment, the rotating mechanism 90 is provided between the left and right side pulleys 84, but the present disclosure is not limited to this. For example, the structure of a first modified example that is shown in FIG. 19 may be employed.

First Modified Example

Figure 19:
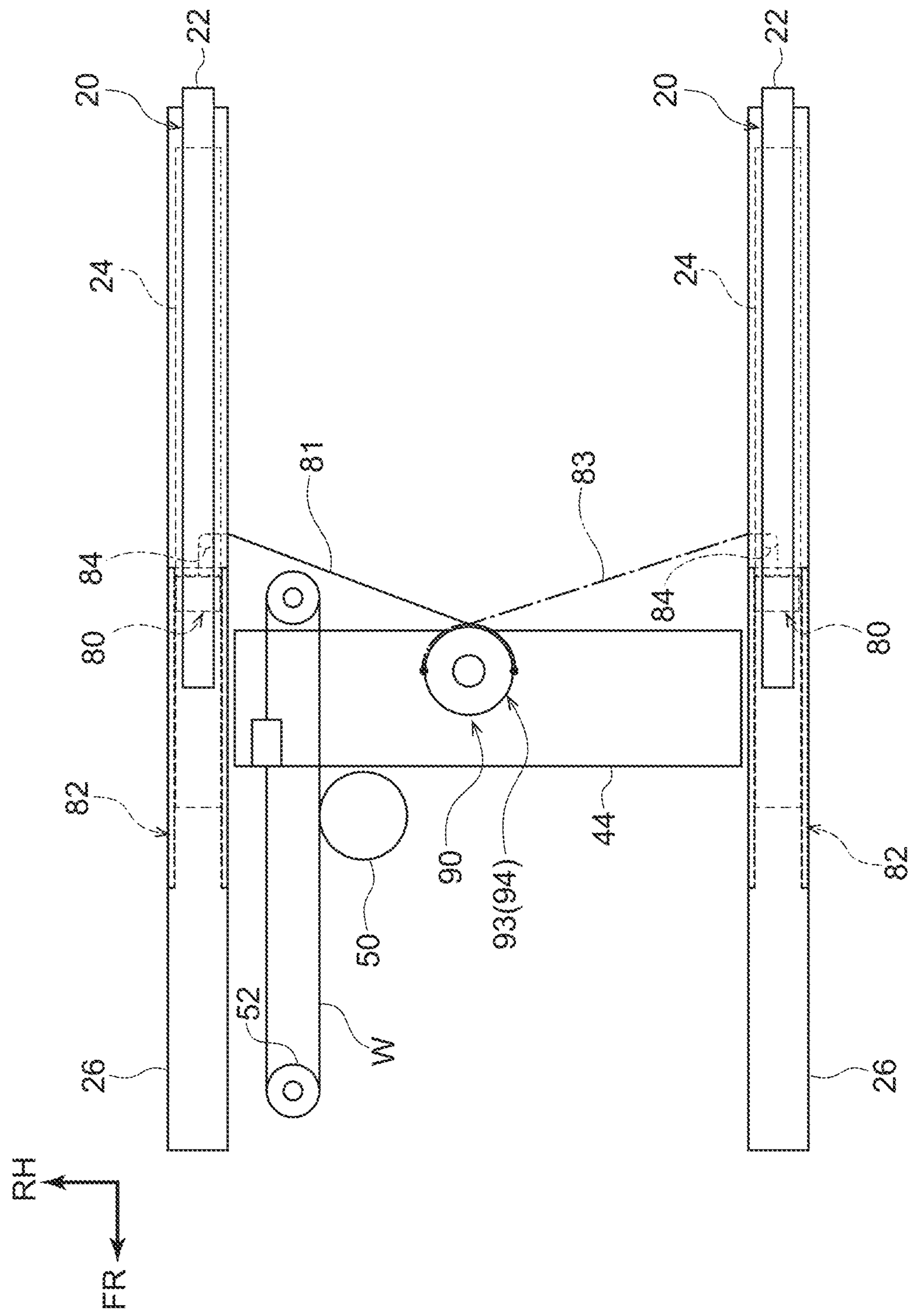
FIG. 19 is a schematic plan view that corresponds to FIG. 16 and illustrates a first modified example of the fourth embodiment.

As shown in FIG. 19, in the present modified example, the rotating mechanism 90 is positioned further toward the vehicle front side than in FIG. 16. Therefore, after being trained around the side pulley 84, the wire 83 is extended at an incline toward the vehicle right side and the vehicle front side, and is fixed to the first disc 93.

On the other hand, after being trained around the side pulley 84, the wire 81 is extended at an incline toward the vehicle left side and the vehicle front side, and is fixed to the second disc 94. Because the position of the rotating mechanism 90 may be changed to a different given position in this way, the configuration of the installation space for the rotating mechanism 90 is subject to a greater degree of freedom.

Further, in the present embodiment, the inertial movement of the slide rails 20 is damped by utilizing the frictional resistance that arises between the first disc 93 and the second disc 94 that structure the rotating mechanism 90. However, another structure may be employed. For example, the structure of a second modified example that is shown in FIG. 20 and FIG. 21 may be employed.

Second Modified Example

Figure 20:
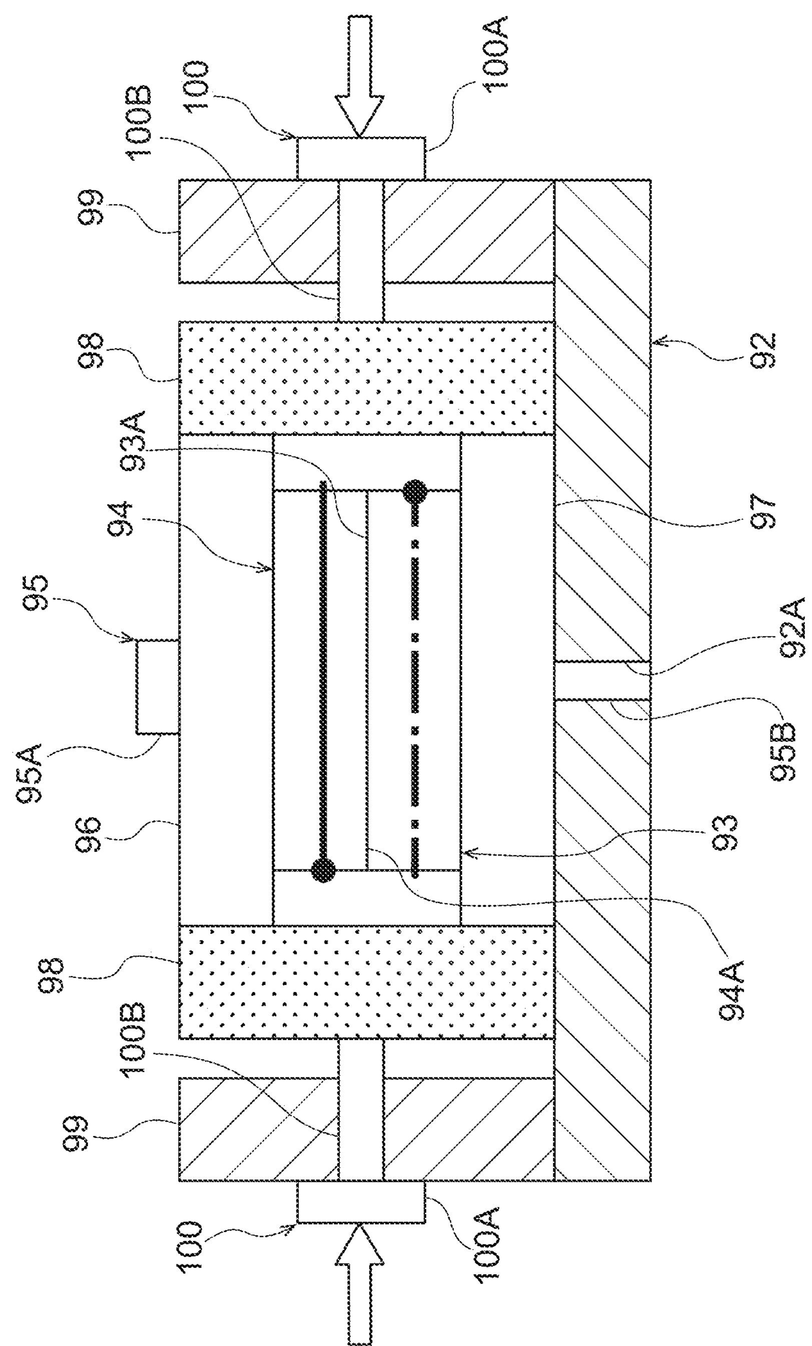
FIG. 20 is an enlarged rear view of main portions that corresponds to FIG. 17 and illustrates a second modified example of the fourth embodiment.
Figure 21:
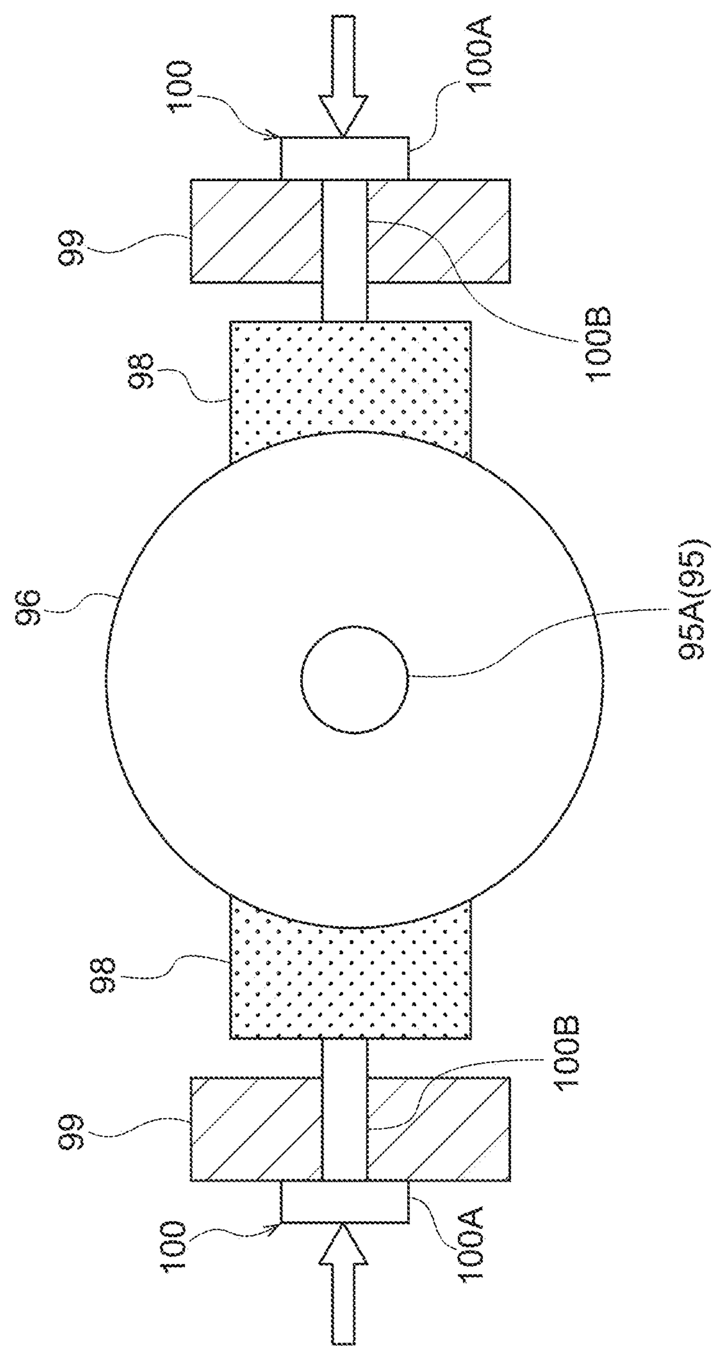
FIG. 21 is a plan view of an energy absorbing member of FIG. 20.

As shown in FIG. 20, in this modified example, frictional resistance is generated due to shoes 98 being pushed. Concretely, a lower disc 97, the first disc 93, the second disc 94 and an upper disc 96 are stacked on the base 92.

The lower disc 97 is placed on the base 92, and is formed to have a larger diameter than the first disc 93. The first disc 93 is fixed to the upper surface of the lower disc 97. Therefore, the lower disc 97 and the first disc 93 rotate integrally.

The second disc 94 is superposed on the first disc 93. The upper disc 96 is fixed to the upper surface of the second disc 94. The upper disc 96 is formed to have a larger diameter than the second disc 94, and has substantially the same diameter as the lower disc 97. The upper disc 96 rotates integrally with the second disc 94. Further, in the present modified example, both the upper surface 94A of the first disc 93 and the lower surface 93A of the second disc 94 are surfaces that are not uneven, and the frictional resistance that arises between the first disc 93 and the second disc 94 is low.

Here, the shoes 98 are disposed at the outer side of the lower disc 97 and the upper disc 96. As shown in FIG. 21, the shoes 98 are disposed so as to sandwich the lower disc 97 and the upper disc 96 therebetween from the both sides. The surfaces, which face one another, at the respective shoes 98 are formed as curved surfaces that correspond to the lower disc 97 and the upper disc 96.

As shown in FIG. 20, side wall portions 99 stand upright at the both end portions of the base 92. Push-in pins 100 are inserted-through the respective side wall portions. The push-in pins 100 have head portions 100A and shaft portions 100B. Due to the shaft portions 100B being pushed against the shoes 98, the shoes 98 are pushed against the upper disc 96 and the lower disc 97.

As described above, in the present modified example, due to the wire 83 and the wire 81 being tensed, the first disc 93, which is connected to the wire 83, and the lower disc 97 are rotated in one direction. On the other hand, the second disc 94, which is connected to the wire 81, and the upper disc 96 are rotated in the other direction (the opposite direction). Due thereto, frictional resistance arises at the planarly contacting portions of the shoes 98 and the outer peripheral surfaces of the lower disc 97 and the upper disc 96, and inertial movement of the slide rails 20 toward the vehicle front side may be damped.

Although seat sliding structures for a vehicle relating to embodiments have been described above, the present disclosure may, of course, be implemented in various forms within a scope that does not depart from the gist thereof. For example, in the above-described first embodiment, as shown in FIG. 4, the deforming member 58 is formed by a metal member being folded-over in a zigzag shape. However, the present disclosure is not limited to this, and a deforming member of another shape may be used. Namely, similar effects may be obtained provided that the deforming member is a member that is not plastically deformed by the tension of the wire W, but is plastically deformed by the load at the time of a front collision. With regard to the deforming member 87 that is shown in FIG. 12 as well, similarly, another member may be used provided that it is a member that is not plastically deformed by the tension of the wire 81 and the wire 83, but is plastically deformed by the load at the time of a front collision.

Further, in the above-described second embodiment, as shown in FIG. 7, the rod receiving portions 76 are provided at the rear surface of the cross member 44, but the present disclosure is not limited to this. For example, the rod receiving portions 76 may be provided at the lower rails 24 that structure the slide rails 20. Namely, by placing the rods 68 directly beneath the lower rails 24 and having the rod receiving portions 76 extend-out from the lower surfaces of the lower rails 24 toward the vehicle lower side, the rod receiving portions 76 and the rear end portions 68B of the rods 68 that are popped-up at the time of a front collision of the vehicle may be made to engage.

Moreover, in the above-described fourth embodiment, as shown in FIG. 17, frictional resistance is generated due to the upper surface 94A of the first disc 93 and the lower surface 93A of the second disc 94, which are uneven, being disposed so as to face one another. However, the present disclosure is not limited to this, and, for example, a frictional member that is formed of a material such as that of a brake pad or the like may be used.

Still further, in the above-described embodiments, the rail guiding members 26 extend horizontally, but the present disclosure is not limited to this. For example, the rail guiding members 26 may be tilted such that, as seen from the vehicle transverse direction, the front portions thereof are positioned further upward than the rear portions. In this case, inertial movement of the slide rails 20 toward the vehicle front side may be damped by the inclines.

What is claimed is:

1. A seat sliding structure for a vehicle, the seat sliding structure comprising:

a pair of slide rails, wherein the pair of slide rails includes a left slide rail and a right slide rail, and each of the left slide rail and the right slide rail includes an upper rail attached to a lower portion of a vehicle seat, and a lower rail supporting the upper rail to allow the upper rail to slide in a vehicle longitudinal direction;

rail guiding members fixed to a floor panel, and supporting the lower rails to allow the lower rails to slide in the vehicle longitudinal direction between a driving position at a vehicle front side and a relaxation position at a vehicle rear side;

a locking mechanism configured to lock a movement of the pair of slide rails at the driving position and at the relaxation position rearward of the driving position, and release a locked state of the pair of slide rails in response to a frontal collision of the vehicle being detected or predicted;

a damping mechanism configured to, in response to the frontal collision of the vehicle, damp an inertial movement of the pair of slide rails from the relaxation position toward the vehicle front side; and a moving mechanism including a cross member connecting the pair of slide rails in a vehicle transverse direction, a wire trained around pulleys provided as a pair in the vehicle longitudinal direction, and a fixing bracket fixing the wire to the cross member, wherein the damping mechanism has a deforming member having one end side mounted to the cross member and another end side attached to the wire, the deforming member being plastically deformable by being pulled and stretched in conjunction with an inertial movement of the cross member toward the vehicle front side.

2. A seat sliding structure for a vehicle, the seat sliding structure comprising:

a pair of slide rails, wherein the pair of slide rails includes a left slide rail and a right slide rail, and each of the left slide rail and the right slide rail includes an upper rail attached to a lower portion of a vehicle seat, and a lower rail supporting the upper rail to allow the upper rail to slide in a vehicle longitudinal direction;

rail guiding members fixed to a floor panel, and supporting the lower rails to allow the lower rails to slide in the vehicle longitudinal direction between a driving position at a vehicle front side and a relaxation position at a vehicle rear side;

a locking mechanism configured to lock a movement of the pair of slide rails at the relaxation position, and release a locked state of the pair of slide rails in response to a frontal collision of the vehicle being detected or predicted;

a damping mechanism configured to, in response to the frontal collision of the vehicle, damp an inertial movement of the pair of slide rails from the relaxation position toward the vehicle front side; and a moving mechanism including a cross member connecting the pair of slide rails in a vehicle transverse direction, a wire trained around pulleys provided as a pair in the vehicle longitudinal direction, and a fixing bracket fixing the wire to the cross member, wherein the damping mechanism has a deforming member having one end side mounted to the cross member and another end side attached to the wire, the deforming member being plastically deformable by being pulled and stretched in conjunction with an inertial movement of the cross member toward the vehicle front side.

* * * * *